US010175360B2

(12) United States Patent
Zweigle et al.

(10) Patent No.: US 10,175,360 B2
(45) Date of Patent: Jan. 8, 2019

(54) MOBILE THREE-DIMENSIONAL MEASURING INSTRUMENT

(71) Applicant: FARO Technologies, Inc., Lake Mary, FL (US)

(72) Inventors: Oliver Zweigle, Stuttgart (DE); Bernd-Dietmar Becker, Ludwigsburg (DE); Hamidreza Rajaie, Stuttgart (DE); Robert E. Bridges, Kennett Square, PA (US)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 267 days.

(21) Appl. No.: 15/084,751

(22) Filed: Mar. 30, 2016

(65) Prior Publication Data

US 2016/0291160 A1 Oct. 6, 2016

Related U.S. Application Data

(60) Provisional application No. 62/140,706, filed on Mar. 31, 2015, provisional application No. 62/140,756, (Continued)

(51) Int. Cl.
| | |
|---|---|
| *G01C 3/08* | (2006.01) |
| *G01S 17/89* | (2006.01) |
| *G01S 17/42* | (2006.01) |
| *G01S 7/481* | (2006.01) |
| *G01B 11/25* | (2006.01) |

(Continued)

(52) U.S. Cl.
CPC .......... *G01S 17/89* (2013.01); *G01B 11/2518* (2013.01); *G01S 7/4813* (2013.01); *G01S 17/023* (2013.01); *G01S 17/42* (2013.01); *G01S 17/66* (2013.01); *H04W 4/70* (2018.02);
(Continued)

(58) Field of Classification Search
CPC ...... G01S 17/89; G01S 7/4813; G01S 17/023; G01S 17/42; G01S 17/66; G01S 17/10; G01S 17/36; G01S 17/48; G01B 11/2518; H04W 4/005; H04W 84/12
See application file for complete search history.

(56) References Cited

U.S. PATENT DOCUMENTS

| 6,246,468 B1 | 6/2001 | Dimsdale |
| 6,542,249 B1 | 4/2003 | Kofman et al. |

(Continued)

FOREIGN PATENT DOCUMENTS

| DE | 102009035336 A1 | 11/2010 |
| DE | 102012109481 A1 | 4/2014 |

(Continued)

OTHER PUBLICATIONS

Brenneke et al: "Using 3D laser range data for slam in outsoor enviomments." Proceedings of the 2003 IEEE/RSJ International Conference on Intelligent Robots and Systems. Las Vegas, NV Oct. 27-31, 2003; IEEE US, vol. 1, Oct. 27, 2003, pp. 188-193.

(Continued)

*Primary Examiner* — Samantha K Abraham
(74) *Attorney, Agent, or Firm* — Cantor Colburn LLP

(57) ABSTRACT

A mobile three-dimensional (3D) measuring system includes a 3D measuring device, a multi-legged stand coupled to the 3D measuring device, and a motorized dolly detachably coupled to the multi-legged stand.

20 Claims, 25 Drawing Sheets

Related U.S. Application Data filed on Mar. 31, 2015, provisional application No. 62/140,733, filed on Mar. 31, 2015, provisional application No. 62/140,743, filed on Mar. 31, 2015, provisional application No. 62/140,716, filed on Mar. 31, 2015.

(51) Int. Cl.

| | | |
|---|---|---|
| *H04W 4/70* | (2018.01) | |
| *G01S 17/02* | (2006.01) | |
| *G01S 17/66* | (2006.01) | |
| *H04W 84/12* | (2009.01) | |
| *G01S 17/10* | (2006.01) | |
| *G01S 17/36* | (2006.01) | |
| *G01S 17/48* | (2006.01) | |

(52) U.S. Cl.
CPC ............ *G01S 17/10* (2013.01); *G01S 17/36* (2013.01); *G01S 17/48* (2013.01); *H04W 84/12* (2013.01)

(56) References Cited

U.S. PATENT DOCUMENTS

| | | | |
|---|---|---|---|
| 6,681,145 B1* | 1/2004 | Greenwood | B25J 9/1692 |
| | | | 700/176 |
| 7,069,124 B1 | 6/2006 | Whittaker et al. | |
| 8,384,914 B2 | 2/2013 | Becker et al. | |
| 8,625,106 B2 | 1/2014 | Ossig et al. | |
| 8,699,007 B2 | 4/2014 | Becker et al. | |
| 8,699,036 B2 | 4/2014 | Ditte et al. | |
| 8,705,012 B2 | 4/2014 | Greiner et al. | |
| 8,705,016 B2 | 4/2014 | Schumann et al. | |
| 8,730,477 B2 | 5/2014 | Ruhland et al. | |
| 8,811,767 B2 | 8/2014 | Veeraraghaven et al. | |
| 8,830,485 B2 | 9/2014 | Woloschyn | |
| 8,896,819 B2 | 11/2014 | Schumann et al. | |
| 8,970,823 B2 | 3/2015 | Heidemann et al. | |
| 9,074,883 B2 | 7/2015 | Schumann et al. | |
| 9,279,662 B2 | 3/2016 | Steffey et al. | |
| 9,329,271 B2 | 5/2016 | Ossig et al. | |
| 9,342,890 B2 | 5/2016 | Becker et al. | |
| 9,372,265 B2 | 6/2016 | Zweigle et al. | |
| 9,417,316 B2 | 8/2016 | Schumann et al. | |
| 9,513,107 B2 | 12/2016 | Zweigle et al. | |
| 9,599,455 B2 | 3/2017 | Heidemann et al. | |
| 9,618,620 B2 | 4/2017 | Zweigle et al. | |
| 9,739,886 B2 | 8/2017 | Zweigle et al. | |
| 9,746,559 B2 | 8/2017 | Zweigle et al. | |
| 2004/0027347 A1 | 2/2004 | Farsaie | |
| 2005/0007553 A1* | 1/2005 | Romanoff | B66F 11/048 |
| | | | 352/243 |
| 2006/0110026 A1 | 5/2006 | Strassenburg-Kleciak | |
| 2009/0323121 A1 | 12/2009 | Valkenburg et al. | |
| 2010/0134596 A1 | 6/2010 | Becker | |
| 2010/0237575 A1* | 9/2010 | Price | B62B 3/02 |
| | | | 280/42 |
| 2011/0288684 A1 | 11/2011 | Farlow et al. | |
| 2012/0069352 A1 | 3/2012 | Ossig et al. | |
| 2014/0028805 A1* | 1/2014 | Tohme | G01C 15/002 |
| | | | 348/47 |
| 2014/0063489 A1 | 3/2014 | Steffey et al. | |
| 2014/0078519 A1 | 3/2014 | Steffey et al. | |
| 2014/0226190 A1 | 8/2014 | Bridges et al. | |
| 2014/0240690 A1 | 8/2014 | Newman et al. | |
| 2014/0300906 A1 | 10/2014 | Becker et al. | |
| 2014/0340487 A1* | 11/2014 | Gilliland | G01S 7/4863 |
| | | | 348/48 |
| 2014/0362424 A1 | 12/2014 | Bridges et al. | |
| 2015/0085068 A1 | 3/2015 | Becker et al. | |
| 2015/0085301 A1 | 3/2015 | Becker et al. | |
| 2015/0160342 A1 | 6/2015 | Zweigle et al. | |
| 2015/0160347 A1 | 6/2015 | Zweigle et al. | |
| 2016/0047914 A1 | 2/2016 | Zweigle et al. | |
| 2016/0094934 A1* | 3/2016 | Yang | H04W 4/008 |
| | | | 455/41.2 |

FOREIGN PATENT DOCUMENTS

| | | |
|---|---|---|
| WO | 2013103725 A1 | 7/2013 |
| WO | 2014128498 A2 | 8/2014 |

OTHER PUBLICATIONS

Davidson, A. et al., "MonoSLAM: Real-Time Single Camera SLAM", IEEE Transactions on Pattern Analysis and Machine Intelligence, vol. 29, No. 6, Jun. 1, 2007, pp. 1052-1067, XP011179664.

Gebre, Biruk A., et al., "Remotely Operated and Autonomous Mapping System (ROAMS)", Technologies for Practical Robot Applications, TEPRA 2009, IEEE International Conference on Nov. 9, 2009, pp. 173-178, XP031570394.

Harrison A. et al., "High Quality 3D Laser Ranging Under General Vehicle Motion", 2008 IEEE International Conference on Robotics and Automation, May 19-23, 2008, pp. 7-12, XP031340123.

May, S. et al, "Robust 3D-Mapping with Time-of-Flight Cameras", Intelligent Robots and Systems, IROS 2009, IEEE/RSJ International Conference on Oct. 10, 2009, pp. 1673-1678, XP031581042.

Ohno, K. et al., "Real-Time Robot Trajectory Estimation and 3D Map Construction Using 3D Camera", Intelligent Robots and Systems, 2006 IEEE/RSJ International Conference on Oct. 1, 2006, pp. 5279-5285, XP031006974.

Surmann, H. et al., "An Autonomous Mobile Robot with a 3D Laser Range Finder for 3D Exploration and Digitalization of Indoor Environments", Robotics and Autonomous Systems, Elsevier Science Publishers, vol. 45, No. 3-4, Dec. 31, 2003, pp. 181-198.

Yan, R., et al, "3D Point Cloud Map Construction Based on Line Segments with Two Mutually Perpendicular Laser Sensors", 2013 13th International Conference on Control, Automation and Systems (ICCAS 2013), IEEE, Oct. 20, 2013, pp. 1114-1116.

Ye, C. et al., "Characterization of a 2-D Laser Scanner for Mobile Robot Obstacle Negotiation" Proceedings / 2002 IEEE International Conference on Robotics and Automation, May 11-15, 2002, Washington, D.C., May 1, 2002, pp. 2512-2518, XP009169742.

\* cited by examiner

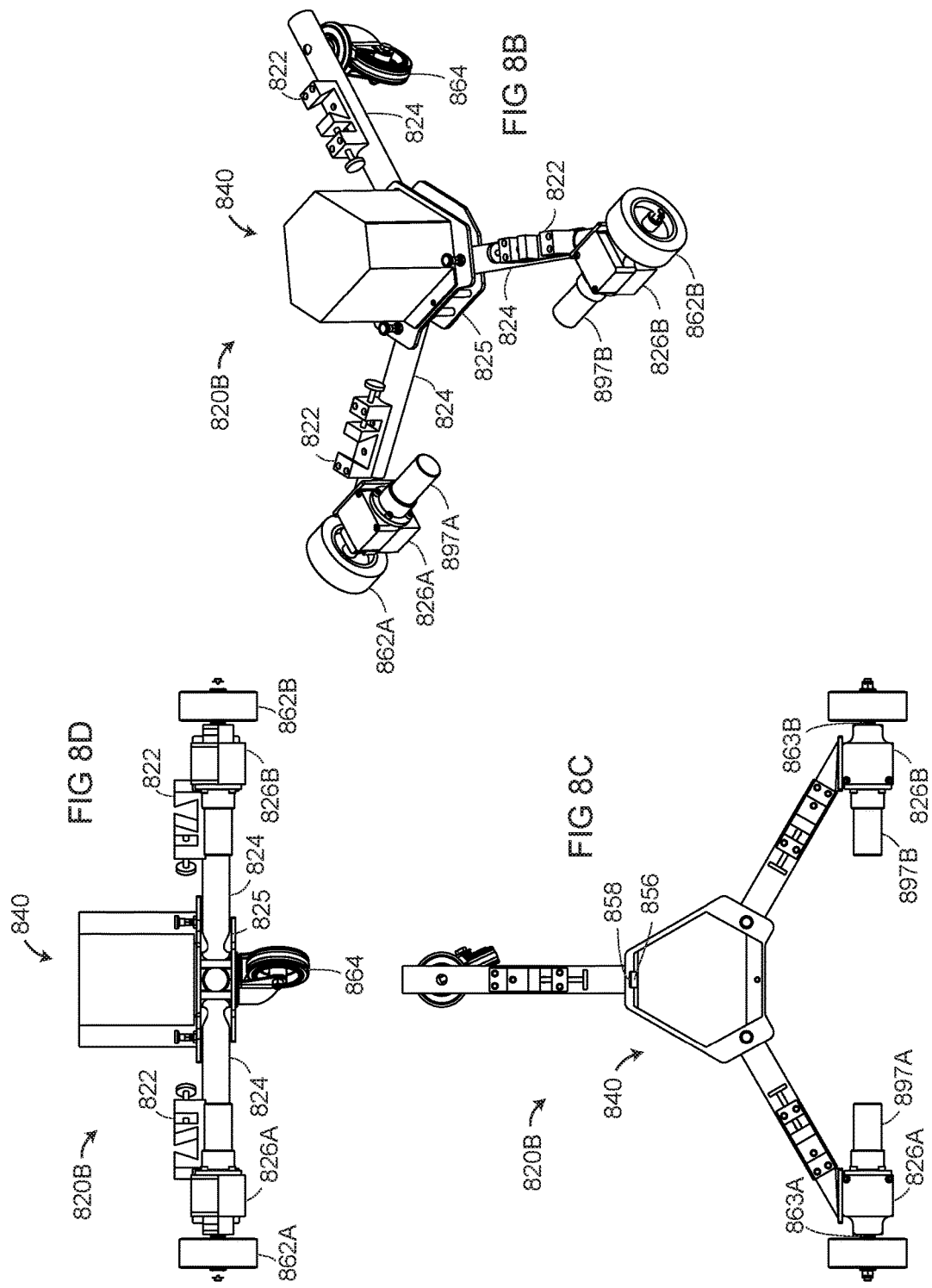

SCANNER
FRAME OF REFERENCE

OBJECT
FRAME OF REFERENCE

MOBILE THREE-DIMENSIONAL MEASURING INSTRUMENT

CROSS REFERENCE TO RELATED APPLICATIONS

This application claims the benefit of U.S. Application No. 62/140,706 filed Mar. 31, 2015, of U.S. Application No. 62/140,716, filed Mar. 31, 2015, of U.S. Application No. 62/140,733, filed Mar. 31, 2015, of U.S. Application No. 62/140,743, filed Mar. 31, 2015, and of U.S. Application No. 62/140,756, filed Mar. 31, 2015, the contents all of which are incorporated by reference.

BACKGROUND OF THE INVENTION

The present disclosure relates to a motorized tripod, which may be used to hold a three-dimensional (3D) measuring instrument. The subject matter disclosed herein relates particularly to a 3D laser scanner time-of-flight (TOF) coordinate measurement device. A 3D laser scanner of this type steers a beam of light to a non-cooperative target such as a diffusely scattering surface of an object. A distance meter in the device measures a distance to the object, and angular encoders measure the angles of rotation of two axles in the device. The measured distance and two angles enable a processor in the device to determine the 3D coordinates of the target.

A TOF laser scanner (or simply TOF scanner) is a scanner in which the distance to a target point is determined based on the speed of light in air between the scanner and a target point. Laser scanners are typically used for scanning closed or open spaces such as interior areas of buildings, industrial installations and tunnels. They may be used, for example, in industrial applications and accident reconstruction applications. A laser scanner optically scans and measures objects in a volume around the scanner through the acquisition of data points representing object surfaces within the volume. Such data points are obtained by transmitting a beam of light onto the objects and collecting the reflected or scattered light to determine the distance, two-angles (i.e., an azimuth and a zenith angle), and optionally a gray-scale value. This raw scan data is collected, stored and sent to a processor or processors to generate a 3D image representing the scanned area or object.

Generating an image requires at least three values for each data point. These three values may include the distance and two angles, or may be transformed values, such as the x, y, z coordinates. In an embodiment, an image is also based on a fourth gray-scale value, which is a value related to irradiance of scattered light returning to the scanner.

Most TOF scanners direct the beam of light within the measurement volume by steering the light with a beam steering mechanism. The beam steering mechanism includes a first motor that steers the beam of light about a first axis by a first angle that is measured by a first angular encoder (or other angle transducer). The beam steering mechanism also includes a second motor that steers the beam of light about a second axis by a second angle that is measured by a second angular encoder (or other angle transducer).

Many contemporary laser scanners include a camera mounted on the laser scanner for gathering camera digital images of the environment and for presenting the camera digital images to an operator of the laser scanner. By viewing the camera images, the operator of the scanner can determine the field of view of the measured volume and adjust settings on the laser scanner to measure over a larger or smaller region of space. In addition, the camera digital images may be transmitted to a processor to add color to the scanner image. To generate a color scanner image, at least three positional coordinates (such as x, y, z) and three color values (such as red, green, blue "RGB") are collected for each data point.

A 3D image of a scene may require multiple scans from different registration positions. The overlapping scans are registered in a joint coordinate system, for example, as described in U.S. Published Patent Application No. 2012/0069352 ('352), the contents of which are incorporated herein by reference. Such registration is performed by matching targets in overlapping regions of the multiple scans. The targets may be artificial targets such as spheres or checkerboards or they may be natural features such as corners or edges of walls. Some registration procedures involve relatively time-consuming manual procedures such as identifying by a user each target and matching the targets obtained by the scanner in each of the different registration positions. Some registration procedures also require establishing an external "control network" of registration targets measured by an external device such as a total station. The registration method disclosed in '352 eliminates the need for user matching of registration targets and establishing of a control network.

A TOF laser scanner is usually mounted on a tripod or instrument stand while measuring 3D coordinates of its surroundings. An operator is required to move the tripod from location to location as measurements are taken. In many cases, post-processing is required to properly register the 3D coordinate data. The operational and post-processing steps can be time consuming.

Accordingly, while existing 3D scanners are suitable for their intended purposes, there is a need for apparatus and methods providing greater efficiency in 3D measurement according to certain features of embodiments of the present invention.

BRIEF DESCRIPTION OF THE INVENTION

According to one aspect of the invention, a mobile three-dimensional (3D) measuring system includes a 3D measuring device; a multi-legged stand coupled to the 3D measuring device; and a motorized dolly detachably coupled to the multi-legged stand.

According to a further aspect of the invention, a method includes: providing a mobile three-dimensional (3D) measuring system including a 3D time-of-flight (TOF) scanner coupled to a first motorized stand and to a plurality of targets, the first motorized stand including a plurality of motorized wheels configured to propel and turn the first motorized stand under computer control; providing a first image sensor in an environment; providing a computer system in communication with the mobile 3D measuring system and the first image sensor; obtaining with the first image sensor a first image of the plurality of targets; determining by the computer system a first position of the mobile 3D measuring system within an environment frame of reference, the first position based at least in part on the first image; providing the first position to the mobile 3D measuring system; and determining by the mobile 3D measuring system its position within the environment frame of reference based at least in part on the provided first position; projecting a beam of scanner light from the 3D TOF scanner onto an object; measuring with the 3D TOF scanner, in response to the projected beam of scanner light, first 3D coordinates of a first point on the object; determining 3D coordinates of the first point in the environment frame of reference based at least in part on the first 3D coordinates of the first point and on the first position of the mobile 3D measuring system in the environment frame of reference; and storing the first 3D coordinates of the first point in the environment frame of reference.

According to a further aspect of the invention, a method includes: providing a mobile three-dimensional (3D) measuring system including a 3D time-of-flight (TOF) scanner coupled to a first retroreflector, a second retroreflector, a third retroreflector, and a first motorized stand, the first motorized stand including a plurality of motorized wheels configured to propel and turn the first motorized stand under computer control; providing a 3D measuring device in a first device frame of reference, the 3D measuring device configured to steer a device beam of light onto a retroreflector target, to measure a distance, a first angle, and a second angle from the 3D measuring device to the retroreflector target, and to determine 3D coordinates of the retroreflector target based at least on the measured distance, the measured first angle, and the measured second angle; activating the first motorized stand to move the mobile 3D measuring system to a first position; projecting a beam of scanner light from the 3D TOF scanner onto an object; measuring with the 3D TOF scanner, in response to the projected beam of scanner light, first 3D coordinates of a first point on the object; measuring with the 3D measuring device first 3D coordinates of the first retroreflector, first 3D coordinates of the second retroreflector, and first 3D coordinates of the third retroreflector; determining registered 3D coordinates of the first point in the first device frame of reference based at least in part on the measured first 3D coordinates of the first point on the object, the measured first 3D coordinates of the first retroreflector, the measured first 3D coordinates of the second retroreflector, and the measured first 3D coordinates of the third retroreflector; and storing the registered 3D coordinates of the first point.

According to a further aspect of the invention, a method includes: providing a mobile three-dimensional (3D) measuring system including a 3D scanner coupled to a first retroreflector, a second retroreflector, a third retroreflector, and a first motorized stand, the first motorized stand including a plurality of motorized wheels configured to propel and turn the first motorized stand under computer control, the 3D scanner including a projector and a camera, the projector configured to project a pattern of light, the camera separated from the projector by a baseline distance; providing a 3D measuring device in a first device frame of reference, the 3D measuring device configured to steer a beam of light onto a retroreflector target, to measure a distance, a first angle, and a second angle from the 3D measuring device to the retroreflector target, and to determine 3D coordinates of the retroreflector target based at least on the measured distance, the measured first angle, and the measured second angle; activating the first motorized stand to move the mobile 3D measuring system to a first position; projecting with the projector a first pattern of light onto an object; capturing with the camera a first image of the first pattern of light on the object; determining first measured 3D coordinates of a first point on the object based at least in part on the projected first pattern of light, the captured first image, and the baseline distance; with the 3D measuring device, determining in the first device frame of reference first 3D coordinates of the first retroreflector, first 3D coordinates of the second retroreflector, and first 3D coordinates of the third retroreflector; determining registered 3D coordinates of the first point in the first device frame of reference based at least in part on the first measured 3D coordinates of the first point, the first 3D coordinates of the first retroreflector, the first 3D coordinates of the second retroreflector, and the first 3D coordinates of the third retroreflector; and storing the registered 3D coordinates of the first point.

According to a further aspect of the invention, a method includes: providing a mobile three-dimensional (3D) measuring system including a 3D scanner coupled to a first six degree-of-freedom (six-DOF) retroreflector target and a first motorized stand, the first motorized stand including a plurality of motorized wheels configured to propel and turn the first motorized stand under computer control, the 3D scanner including a projector and a camera, the projector configured to project a pattern of light, the camera separated from the projector by a baseline distance; providing a six-DOF laser tracker configured to determine six degrees of freedom of a six-DOF retroreflector target; activating the first motorized stand to move the mobile 3D measuring system to a first position; projecting with the projector a first pattern of light onto an object; capturing with the camera a first image of the first pattern of light on the object; determining first measured 3D coordinates of a first point on the object based at least in part on the projected first pattern of light, the captured first image, and the baseline distance; with the six-DOF laser tracker, determining in a first device frame of reference first six-DOF values of the first six-DOF retroreflector target; determining registered 3D coordinates of the first point in the first device frame of reference based at least in part on the first measured 3D coordinates of the first point and the first six-DOF values of the first six-DOF retroreflector target; and storing the registered 3D coordinates of the first point.

According to a further aspect of the invention, a method includes: providing a mobile three-dimensional (3D) measuring system including a 3D scanner coupled to a first motorized stand and to a plurality of targets, the first motorized stand including a plurality of motorized wheels configured to propel and turn the first motorized stand under computer control, the 3D scanner including a projector and a camera, the projector configured to project a pattern of light, the camera separated from the projector by a scanner baseline distance; providing a computer system in communication with the mobile 3D measuring system; providing a first image sensor in an environment frame of reference; obtaining with the first image sensor a first image of the plurality of targets; determining by the computer system a first position of the mobile 3D measuring system within the environment frame of reference based at least in part on the first image; providing the first position to the mobile 3D measuring system; determining by the mobile 3D measuring system its position within the environment frame of reference based at least in part on the first position; and storing the determined position of the 3D measuring system within the environment frame of reference.

According to a further aspect of the invention, a method, includes: providing a mobile three-dimensional (3D) measuring system that includes a 3D measuring device and a motorized stand; moving, with the motorized stand, the mobile 3D measuring system to a first position, measuring with the 3D measuring device 3D coordinates of a first point on a diffusely scattering surface, and measuring with the 3D measuring device first 3D coordinates of at least three cooperative targets; moving, with the motorized stand, the mobile 3D measuring system to a second position, measuring with the 3D measuring device 3D coordinates of a second point on the diffusely scattering surface, and measuring with the 3D measuring device second 3D coordinates of the at least three cooperative targets; determining 3D coordinates of the first point and the second point in a common frame of reference based at least in part on the measured 3D coordinates of the first point, the measured 3D coordinates of the second point, the measured first 3D coordinates of the at least three cooperative targets at the first position, and the measured second 3D coordinates of the at least three cooperative targets measured at the second position; and storing the determined 3D coordinates of the first point and the second point in the common frame of reference.

According to a further aspect of the invention, a method includes: providing a plurality of mobile three-dimensional (3D) measuring systems, each system including a 3D measuring device and a motorized stand, each 3D measuring device configured to project light onto a point and to determine 3D coordinates of the point by measuring a distance, a first angle, and a second angle to the point; providing a user interface configured to enable user control of the plurality of mobile 3D measuring systems; and by an operator, concurrently directing actions of the plurality of mobile 3D measuring systems through the user interface.

According to a further aspect of the invention, a method includes: providing a mobile 3D measuring system including a 3D measuring device and a motorized stand, the 3D measuring device configured to project light onto a point and to determine 3D coordinates of the point by measuring a distance, a first angle, and a second angle to the point; activating the motorized stand to locate building elements in need of trim; measuring with the mobile 3D measuring system a size and shape of each required trim element; and providing a link between building location and trim dimensions.

According to a further aspect of the invention, a method includes: providing a mobile 3D measuring system including a 3D measuring device and a motorized stand, the 3D measuring device configured to project light onto a point and to determine 3D coordinates of the point by measuring a distance, a first angle, and a second angle to the point; measuring with the mobile 3D measuring system a size and shape of a floor region; and cutting a floor covering to the measured sizes and shape of the floor region.

According to a further aspect of the invention, a method includes: providing a mobile 3D measuring system including a 3D measuring device and a motorized stand, the 3D measuring device configured to project light onto a point and to determine 3D coordinates of the point by measuring a distance, a first angle, and a second angle to the point; obtaining electronics design plans; scanning a room with the mobile 3D measuring system to obtain measured 3D information; and generating electronic information giving detailed shape and size of the countertops based at least in part on the electronics design plans and the measured 3D information.

According to a further aspect of the invention, a method includes: providing a mobile 3D measuring system including a 3D measuring device and a motorized stand, the motorized stand configured to move the 3D measuring device under computer control, the 3D measuring device configured to project light onto a point and to determine 3D coordinates of the point by measuring a distance, a first angle, and a second angle to the point, the 3D measuring device further configured to emit a visible beam of light as a pointer beam; measuring with the 3D measuring device 3D coordinates of objects in an environment; providing electronic plans indicating a desired location of a construction installation line within the environment; and emitting with the 3D measuring device the visible beam of light to illuminate the construction installation line in the environment, the illuminated construction installation line positioned within the environment based at least in part on measured 3D coordinates of objects in the environment and on the electronic plans.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIGS. 8B, 8C, and 8D are perspective, top and front views, respectively, of a motorized dolly according to an embodiment;

The detailed description explains embodiments of the invention, together with advantages and features, by way of example with reference to the drawings.

DETAILED DESCRIPTION OF THE INVENTION

The present invention relates to a device that includes a 3D scanner and a two-dimensional (2D) scanner working cooperatively to provide automatic registration of 3D scans.

Figure 1:
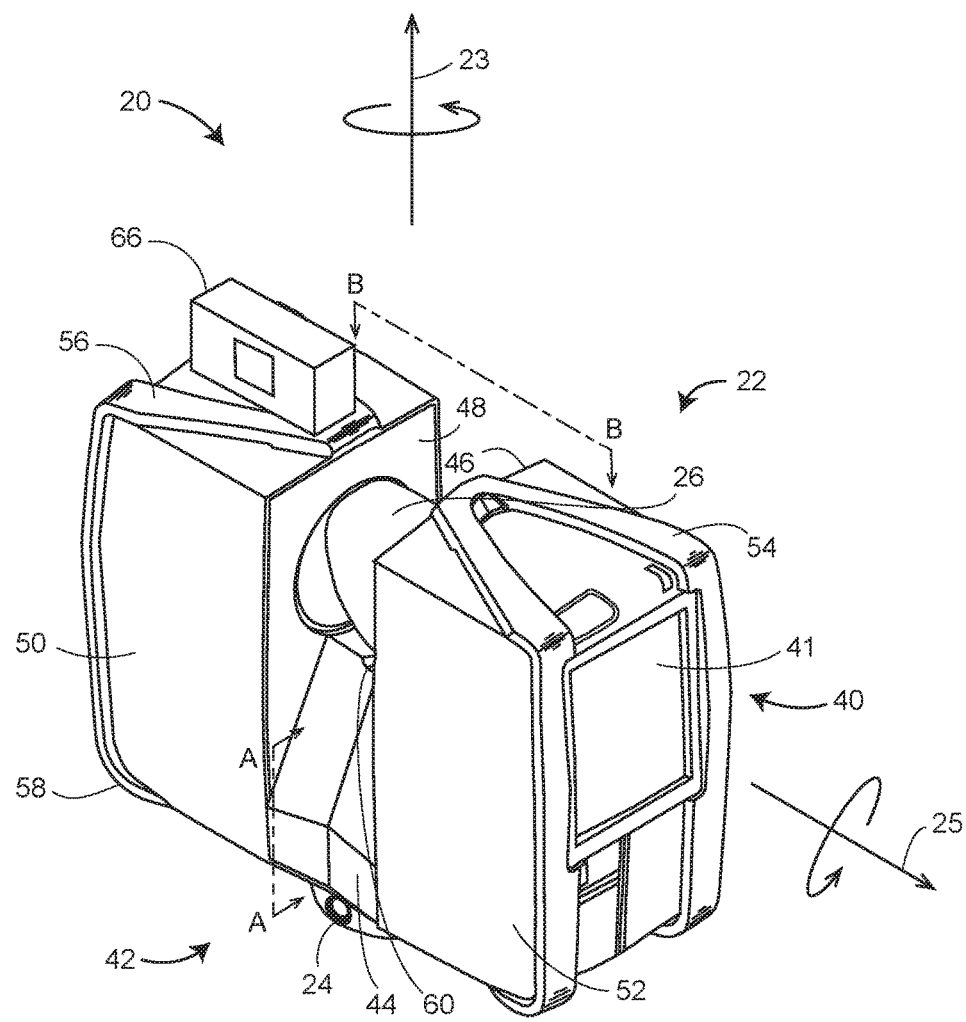
FIG. 1 is a perspective view of a laser scanner in accordance with an embodiment of the invention.
Figure 2:
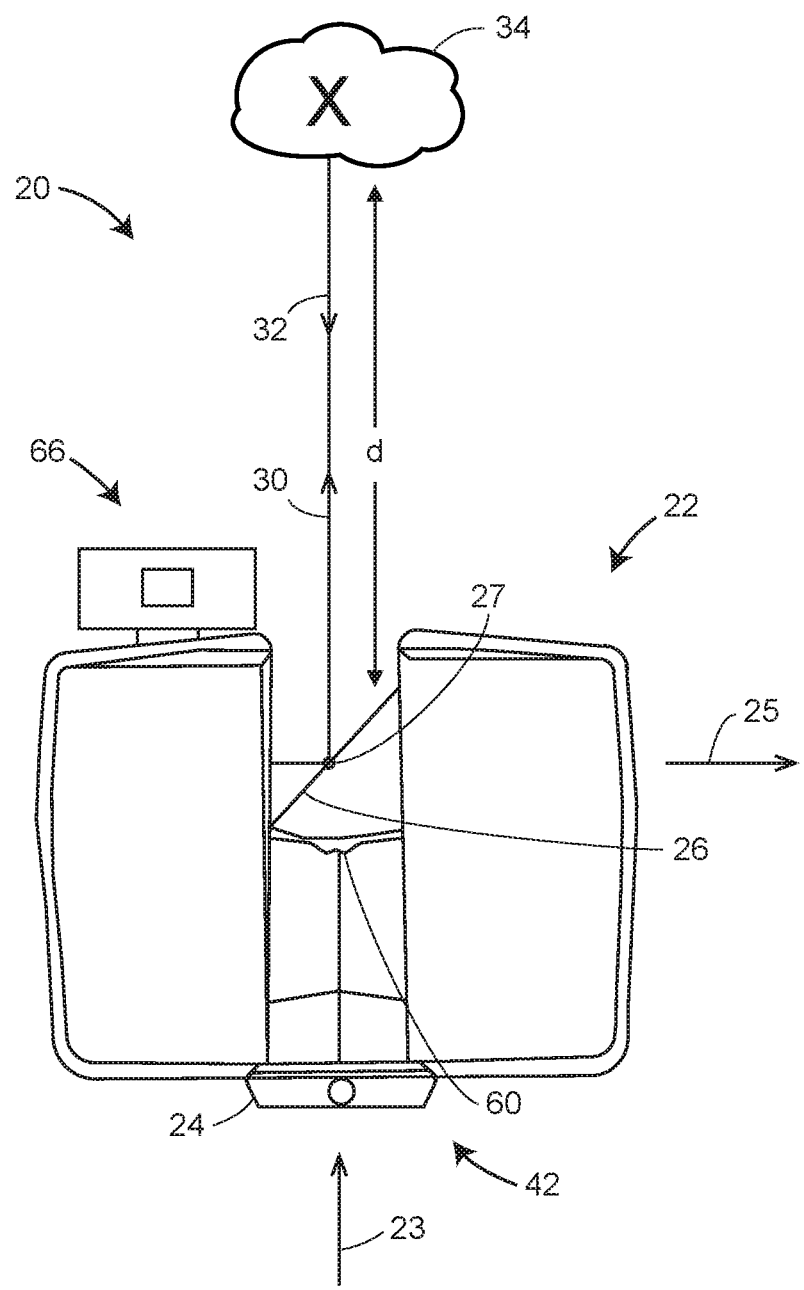
FIG. 2 is a side view of the laser scanner illustrating a method of measurement.
Figure 3:
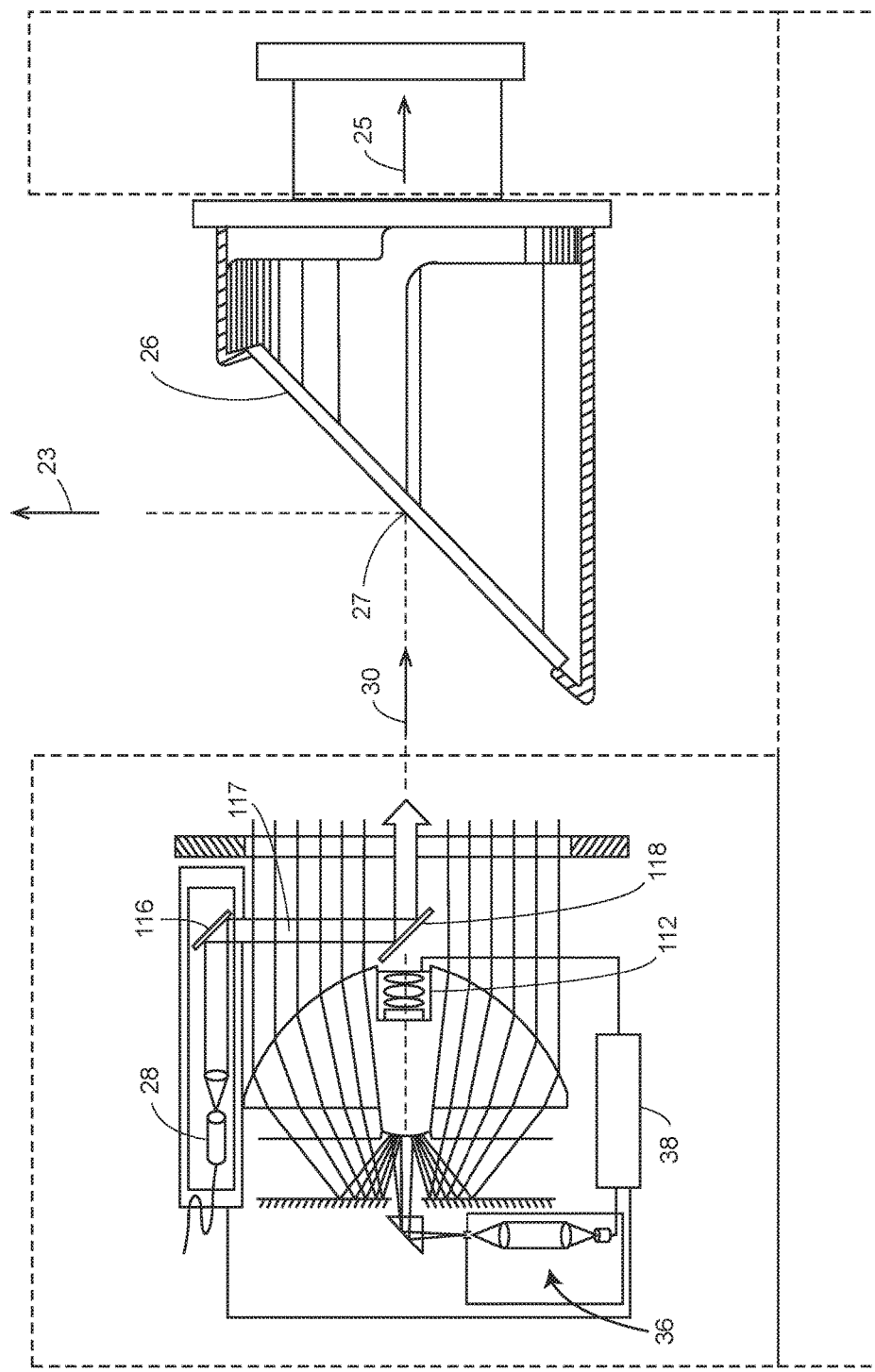
FIG. 3 is a schematic illustration of the optical, mechanical, and electrical components of the laser scanner.

Referring now to FIGS. 1-3, a laser scanner 20 is shown for optically scanning and measuring the environment surrounding the laser scanner 20. The laser scanner 20 has a measuring head 22 and a base 24. The measuring head 22 is mounted on the base 24 such that the laser scanner 20 may be rotated about a vertical axis 23. In one embodiment, the measuring head 22 includes a gimbal point 27 that is a center of rotation about the vertical axis 23 and a horizontal axis 25. The measuring head 22 has a rotary mirror 26, which may be rotated about the horizontal axis 25. The rotation about the vertical axis may be about the center of the base 24. The terms vertical axis and horizontal axis refer to the scanner in its normal upright position. It is possible to operate a 3D coordinate measurement device on its side or upside down, and so to avoid confusion, the terms azimuth axis and zenith axis may be substituted for the terms vertical axis and horizontal axis, respectively. The term pan axis or standing axis may also be used as an alternative to vertical axis.

The measuring head 22 is further provided with an electromagnetic radiation emitter, such as light emitter 28, for example, that emits an emitted light beam 30. In one embodiment, the emitted light beam 30 is a coherent light beam such as a laser beam. The laser beam may have a wavelength range of approximately 300 to 1600 nanometers, for example 790 nanometers, 905 nanometers, 1550 nanometers, or less than 400 nanometers. It should be appreciated that other electromagnetic radiation beams having greater or smaller wavelengths may also be used. The emitted light beam 30 is amplitude or intensity modulated, for example, with a sinusoidal waveform or with a rectangular waveform. The emitted light beam 30 is emitted by the light emitter 28 onto the rotary mirror 26, where it is deflected to the environment. A reflected light beam 32 is reflected from the environment by an object 34. The reflected or scattered light is intercepted by the rotary mirror 26 and directed into a light receiver 36. The directions of the emitted light beam 30 and the reflected light beam 32 result from the angular positions of the rotary mirror 26 and the measuring head 22 about the axes 25 and 23, respectively. These angular positions in turn depend on the corresponding rotary drives or motors.

Coupled to the light emitter 28 and the light receiver 36 is a controller 38. The controller 38 determines, for a multitude of measuring points X, a corresponding number of distances d between the laser scanner 20 and the points X on object 34. The distance to a particular point X is determined based at least in part on the speed of light in air through which electromagnetic radiation propagates from the device to the object point X. In one embodiment the phase shift of modulation in light emitted by the laser scanner 20 and the point X is determined and evaluated to obtain a measured distance d.

The speed of light in air depends on the properties of the air such as the air temperature, barometric pressure, relative humidity, and concentration of carbon dioxide. Such air properties influence the index of refraction n of the air. The speed of light in air is equal to the speed of light in vacuum c divided by the index of refraction. In other words, $c_{air}=c/n$. A laser scanner of the type discussed herein is based on the time-of-flight (TOF) of the light in the air (the round-trip time for the light to travel from the device to the object and back to the device). Examples of TOF scanners include scanners that measure round trip time using the time interval between emitted and returning pulses (pulsed TOF scanners), scanners that modulate light sinusoidally and measure phase shift of the returning light (phase-based scanners), as well as many other types. A method of measuring distance based on the time-of-flight of light depends on the speed of light in air and is therefore easily distinguished from methods of measuring distance based on triangulation. Triangulation-based methods involve projecting light from a light source along a particular direction and then intercepting the light on a camera pixel along a particular direction. By knowing the distance between the camera and the projector and by matching a projected angle with a received angle, the method of triangulation enables the distance to the object to be determined based on one known length and two known angles of a triangle. The method of triangulation, therefore, does not directly depend on the speed of light in air.

In one mode of operation, the scanning of the volume around the laser scanner 20 takes place by rotating the rotary mirror 26 about axis 25 relatively quickly while rotating the measuring head 22 about axis 23 relatively slowly, thereby moving the assembly in a spiral pattern. In an exemplary embodiment, the rotary mirror rotates at a maximum speed of 5820 revolutions per minute. For such a scan, the gimbal point 27 defines the origin of the local stationary reference system. The base 24 rests in this local stationary reference system.

In addition to measuring a distance d from the gimbal point 27 to an object point X, the scanner 20 may also collect gray-scale information related to the received optical power (equivalent to the term "brightness.") The gray-scale value may be determined at least in part, for example, by integration of the bandpass-filtered and amplified signal in the light receiver 36 over a measuring period attributed to the object point X.

The measuring head 22 may include a display device 40 integrated into the laser scanner 20. The display device 40 may include a graphical touch screen 41, as shown in FIG. 1, which allows the operator to set the parameters or initiate the operation of the laser scanner 20. For example, the screen 41 may have a user interface that allows the operator to provide measurement instructions to the device, and the screen may also display measurement results.

The laser scanner 20 includes a carrying structure 42 that provides a frame for the measuring head 22 and a platform for attaching the components of the laser scanner 20. In one embodiment, the carrying structure 42 is made from a metal such as aluminum. The carrying structure 42 includes a traverse member 44 having a pair of walls 46, 48 on opposing ends. The walls 46, 48 are parallel to each other and extend in a direction opposite the base 24. Shells 50, 52 are coupled to the walls 46, 48 and cover the components of the laser scanner 20. In the exemplary embodiment, the shells 50, 52 are made from a plastic material, such as polycarbonate or polyethylene for example. The shells 50, 52 cooperate with the walls 46, 48 to form a housing for the laser scanner 20.

On an end of the shells 50, 52 opposite the walls 46, 48 a pair of yokes 54, 56 are arranged to partially cover the respective shells 50, 52. In the exemplary embodiment, the yokes 54, 56 are made from a suitably durable material, such as aluminum for example, that assists in protecting the shells 50, 52 during transport and operation. The yokes 54, 56 each includes a first arm portion 58 that is coupled, such as with a fastener for example, to the traverse 44 adjacent the base 24. The arm portion 58 for each yoke 54, 56 extends from the traverse 44 obliquely to an outer corner of the respective shell 50, 54. From the outer corner of the shell, the yokes 54, 56 extend along the side edge of the shell to an opposite outer corner of the shell. Each yoke 54, 56 further includes a second arm portion that extends obliquely to the walls 46, 48. It should be appreciated that the yokes 54, 56 may be coupled to the traverse 42, the walls 46, 48 and the shells 50, 54 at multiple locations.

The pair of yokes 54, 56 cooperate to circumscribe a convex space within which the two shells 50, 52 are arranged. In the exemplary embodiment, the yokes 54, 56 cooperate to cover all of the outer edges of the shells 50, 54, while the top and bottom arm portions project over at least a portion of the top and bottom edges of the shells 50, 52. This provides advantages in protecting the shells 50, 52 and the measuring head 22 from damage during transportation and operation. In other embodiments, the yokes 54, 56 may include additional features, such as handles to facilitate the carrying of the laser scanner 20 or attachment points for accessories for example.

On top of the traverse 44, a prism 60 is provided. The prism extends parallel to the walls 46, 48. In the exemplary embodiment, the prism 60 is integrally formed as part of the carrying structure 42. In other embodiments, the prism 60 is a separate component that is coupled to the traverse 44. When the mirror 26 rotates, during each rotation the mirror 26 directs the emitted light beam 30 onto the traverse 44 and the prism 60. Due to non-linearities in the electronic components, for example in the light receiver 36, the measured distances d may depend on signal strength, which may be measured in optical power entering the scanner or optical power entering optical detectors within the light receiver 36, for example. In an embodiment, a distance correction is stored in the scanner as a function (possibly a nonlinear function) of distance to a measured point and optical power (generally unscaled quantity of light power sometimes referred to as "brightness") returned from the measured point and sent to an optical detector in the light receiver 36. Since the prism 60 is at a known distance from the gimbal point 27, the measured optical power level of light reflected by the prism 60 may be used to correct distance measurements for other measured points, thereby allowing for compensation to correct for the effects of environmental variables such as temperature. In the exemplary embodiment, the resulting correction of distance is performed by the controller 38.

In an embodiment, the base 24 is coupled to a swivel assembly (not shown) housed within the carrying structure 42. It includes a motor configured to rotate the measuring head 22 about the axis 23.

An auxiliary image acquisition device 66 may be a device that captures and measures a parameter associated with the scanned volume or the scanned object and provides a signal representing the measured quantities over an image acquisition area. The auxiliary image acquisition device 66 may be, but is not limited to, a pyrometer, a thermal imager, an ionizing radiation detector, or a millimeter-wave detector.

In an embodiment, a camera (first image acquisition device) 112 is located internally to the scanner and may have the same optical axis as the 3D scanner device. In this embodiment, the first image acquisition device 112 is integrated into the measuring head 22 and arranged to acquire images along the same optical pathway as emitted light beam 30 and reflected light beam 32. In this embodiment, the light from the light emitter 28 reflects off a fixed mirror 116 and travels to dichroic beam-splitter 118 that reflects the light 117 from the light emitter 28 onto the rotary mirror 26. The dichroic beam-splitter 118 allows light to pass through at wavelengths different than the wavelength of light 117. For example, the light emitter 28 may be a near infrared laser light (for example, light at wavelengths of 780 nm or 1150 nm), with the dichroic beam-splitter 118 configured to reflect the infrared laser light while allowing visible light (e.g., wavelengths of 400 to 700 nm) to transmit through. In other embodiments, the determination of whether the light passes through the beam-splitter 118 or is reflected depends on the polarization of the light. The digital camera 112 takes 2D photographic images of the scanned area to capture color data to add to the scanned image. In the case of a built-in color camera having an optical axis coincident with that of the 3D scanning device, the direction of the camera view may be easily obtained by simply adjusting the steering mechanisms of the scanner—for example, by adjusting the azimuth angle about the axis 23 and by steering the mirror 26 about the axis 25.

Figure 4:
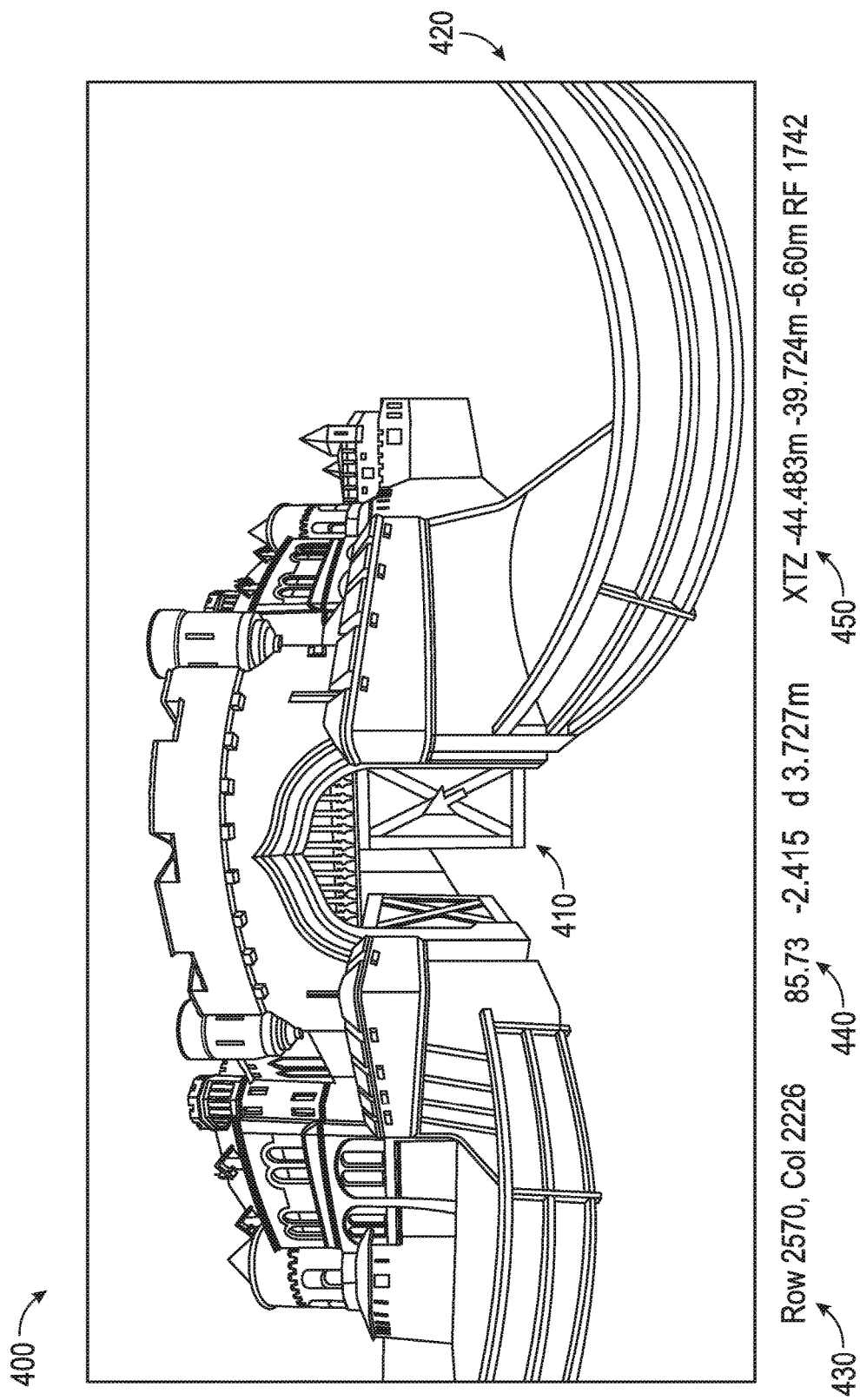
FIG. 4 depicts a planar view of a 3D scanned image.

FIG. 4 depicts an example of a planar view of a 3D scanned image 400. The planar view depicted in FIG. 4 maps an image based on direct mapping of data collected by the scanner. The scanner collects data in a spherical pattern but with data points collected near the poles more tightly compressed than those collected nearer the horizon. In other words, each point collected near a pole represents a smaller solid angle than does each point collected nearer the horizon. Since data from the scanner may be directly represented in rows and column, data in a planar image is conveniently presented in a rectilinear format, as shown in FIG. 4. With planar mapping described above, straight lines appear to be curved, as for example the straight fence railings 420 that appear curved in the planar view of the 3D image. The planar view may be a 3D unprocessed scanned image displaying just the gray-scale values received from the distance sensor arranged in columns and rows as they were recorded. In addition, the 3D unprocessed scanned image of the planar view may be in full resolution or reduced resolution depending on system characteristics (e.g., display device, storage, processor). The planar view may be a 3D processed scanned image that depicts either gray-scale values (resulting from the light irradiance measured by the distance sensor for each pixel) or color values (resulting from camera images which have been mapped onto the scan). Although the planar view extracted from the 3D scanner is ordinarily a gray-scale or color image, FIG. 4 is shown as a line drawing for clarity in document reproduction. The user interface associated with the display unit, which may be integral to the laser scanner, may provide a point selection mechanism, which in FIG. 4 is the cursor 410. The point selection mechanism may be used to reveal dimensional information about the volume of space being measured by the laser scanner. In FIG. 4, the row and column at the location of the cursor are indicated on the display at 430. The two measured angles and one measured distance (the 3D coordinates in a spherical coordinate system) at the cursor location are indicated on the display at 440. Cartesian XYZ coordinate representations of the cursor location are indicated on the display at 450.

Figure 5:
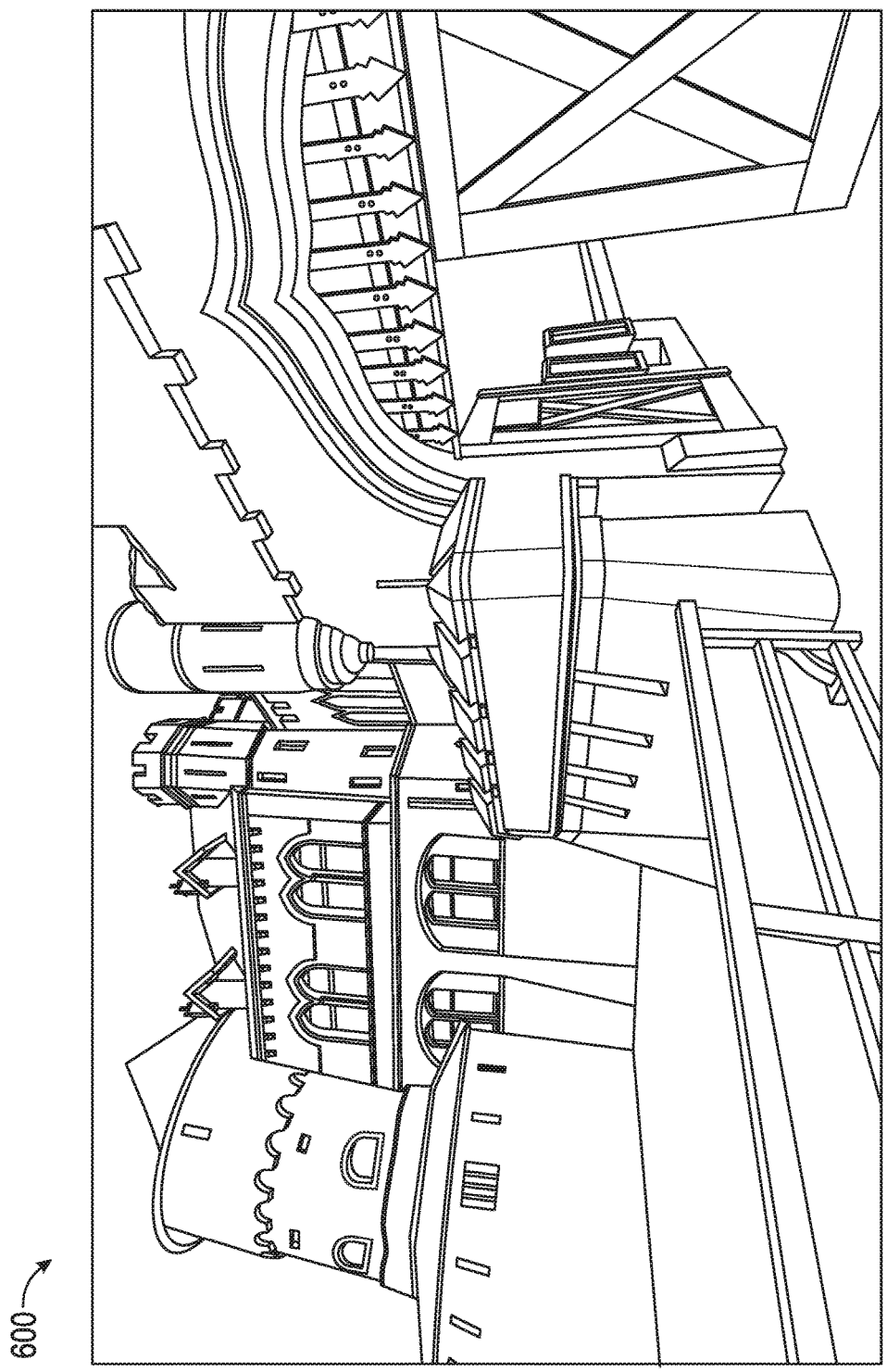
FIG. 5 depicts an embodiment of a panoramic view of a 3D scanned image generated by mapping a planar view onto a sphere.

FIG. 5 depicts an example of a panoramic view of a 3D scanned image 600 generated by mapping a planar view onto a sphere, or in some cases a cylinder. A panoramic view can be a 3D processed scanned image (such as that shown in FIG. 5) in which 3D information (e.g., 3D coordinates) is available. The panoramic view may be in full resolution or reduced resolution depending on system characteristics. It should be pointed out that an image such as FIG. 5 is a 2D image that represents a 3D scene when viewed from a particular perspective. In this sense, the image of FIG. 5 is much like an image that might be captured by a 2D camera or a human eye. Although the panoramic view extracted from the 3D scanner is ordinarily a gray-scale or color image, FIG. 5 is shown as a line drawing for clarity in document reproduction.

The term panoramic view refers to a display in which angular movement is generally possible about a point in space, but translational movement is not possible (for a single panoramic image). In contrast, the term 3D view as used herein refers to generally refers to a display in which provision is made (through user controls) to enable not only rotation about a fixed point but also translational movement from point to point in space.

Figure 6:
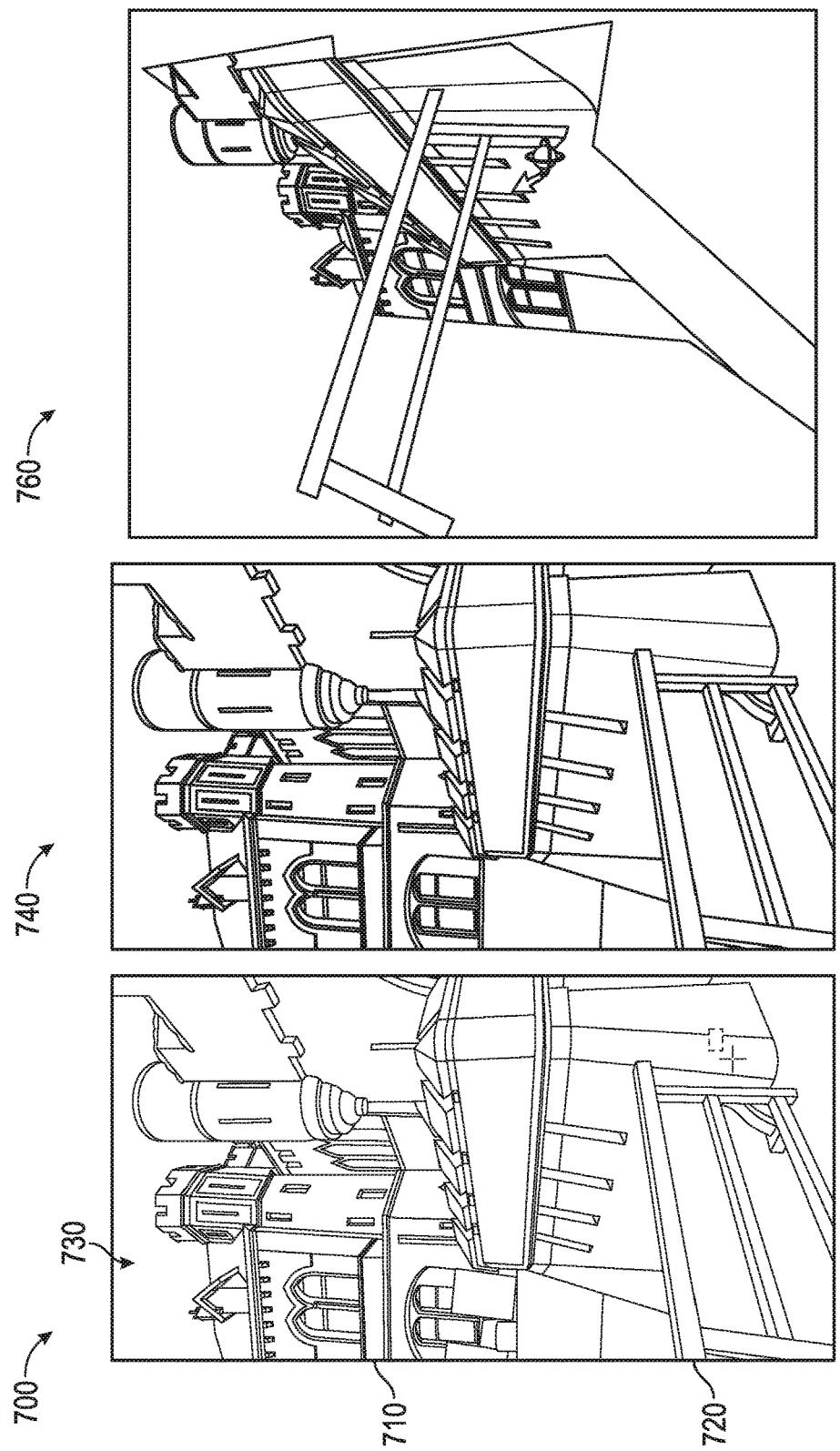
FIGS. 6A, 6B and 6C depict embodiments of a 3D view of a 3D scanned image.
Figure 7:
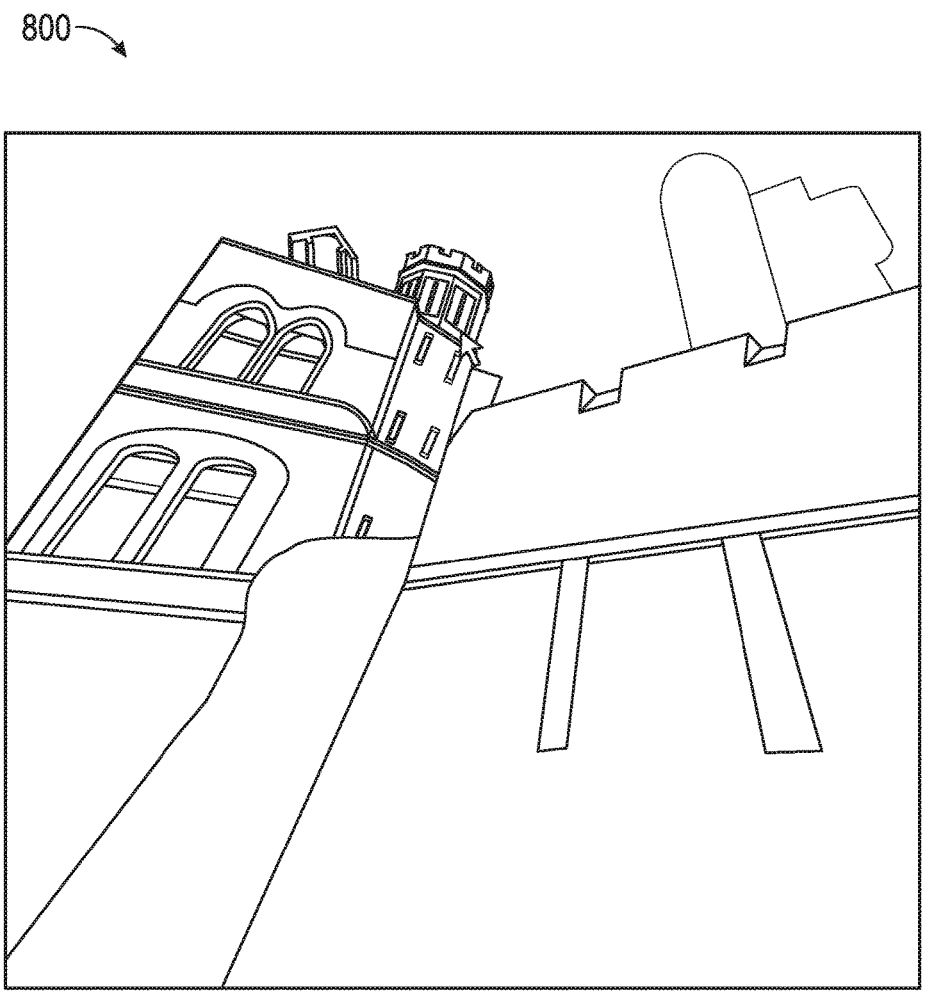
FIG. 7 depicts an embodiment of a 3D view made up of an image of the object of FIG. 6B but viewed from a different perspective and shown only partially.

FIGS. 6A, 6B and 6C depict an example of a 3D view of a 3D scanned image. In the 3D view a user can leave the origin of the scan and see the scan points from different viewpoints and angles. The 3D view is an example of a 3D processed scanned image. The 3D view may be in full resolution or reduced resolution depending on system characteristics. In addition, the 3D view allows multiple registered scans to be displayed in one view. FIG. 6A is a 3D view 710 over which a selection mask 730 has been placed by a user. FIG. 6B is a 3D view 740 in which only that part of the 3D view 710 covered by the selection mask 730 has been retained. FIG. 6C shows the same 3D measurement data as in FIG. 6B except as rotated to obtain a different view. FIG. 7 shows a different view of FIG. 6B, the view in this instance being obtained from a translation and rotation of the observer viewpoint, as well as a reduction in observed area. Although the 3D views extracted from the 3D scanner are ordinarily a gray-scale or color image, FIGS. 6A-C and 7 are shown as line drawings for clarity in document reproduction.

Figure 8A:
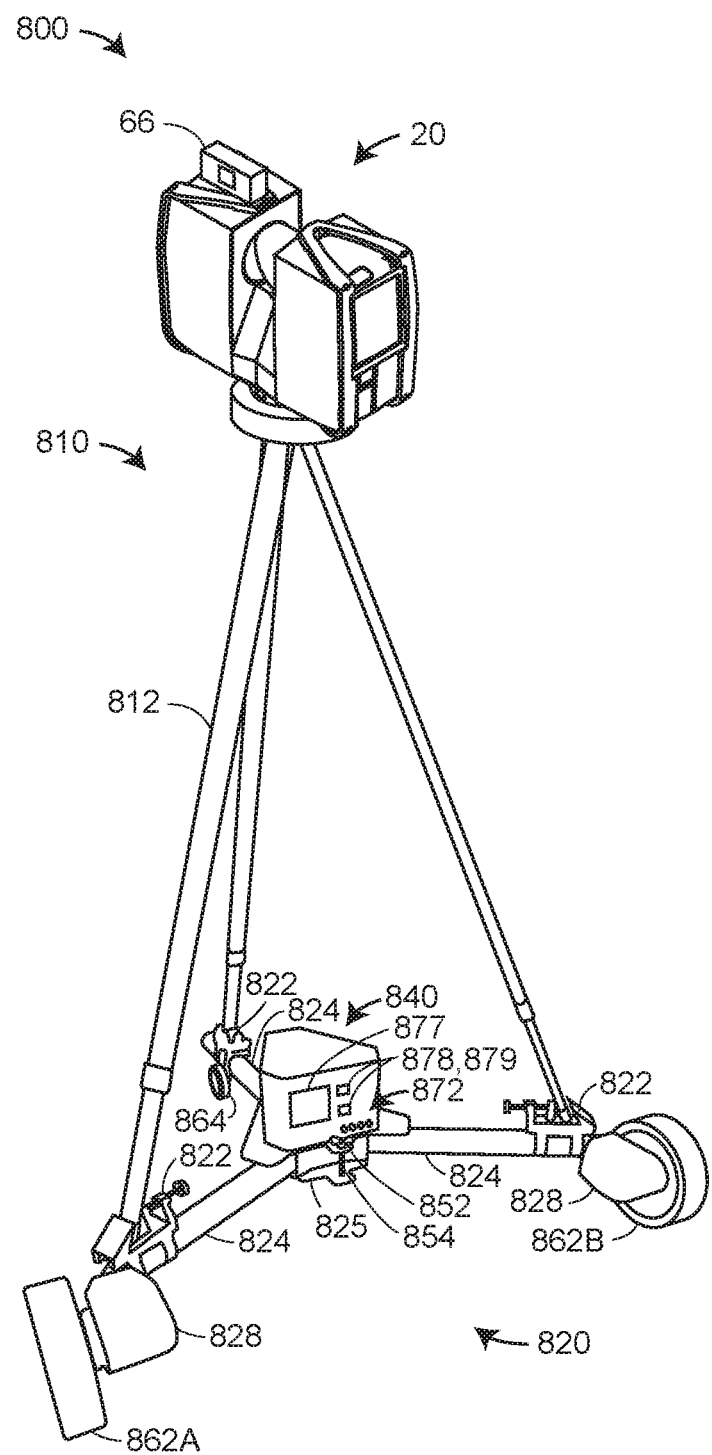
FIG. 8A is a perspective view of a mobile 3D measuring system according to an embodiment.

FIG. 8A shows a mobile 3D measuring system 800 that includes a 3D laser scanner 20 mounted on a motorized tripod assembly 810. In an embodiment, the motorized tripod assembly 810 includes a tripod 812 mounted on a motorized dolly 820. Motorized dolly 820 includes clamps 822 to hold tripod legs in contact with the legs 824 of the motorized dolly 820. As shown in the exploded view FIG. 8B, in an embodiment, each of the three dolly legs 824 are attached to a base plate 825 on one end and to a wheel on the other end. In an embodiment, two wheels 862A and 862B are motorized and may be turned independently by motors, while the third wheel 864 is not motorized and is smaller than the other two. In FIG. 8A, the motors that drive the wheels 862A, 862B are not visible beneath the wheel covers 828. Motor assemblies 826A, 826B are used to drive wheels 862A, 862B, respectively, in alternative embodiment of motorized dolly 820B shown in FIG. 8B. The motor assemblies 826A, 826B drive the wheels 862A, 862B using motors 827A, 827B attached to axles 863A and 863B, respectively. The wheels may be plastic or rubber. For transport on uneven surface, rubber wheels may be inflated. Electrical wires attached to the motor assemblies connect them to a control and power unit 840. In an embodiment, the electrical wires are routed from the motor assemblies 826A, 826B to the control and power unit 840 through hollow dolly legs 824.

Figure 8E:
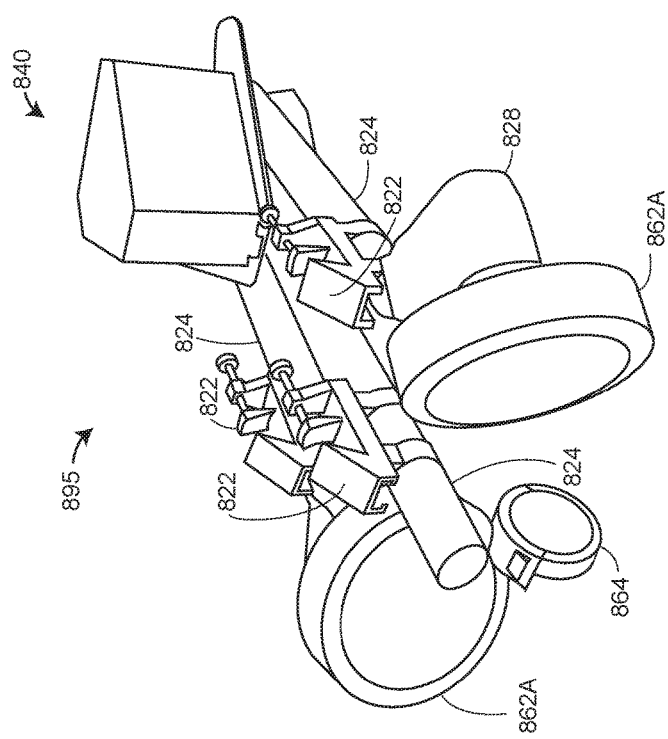
FIG. 8E is a perspective view of a motorized dolly folded into a compact shape according to an embodiment.
Figure 8F:
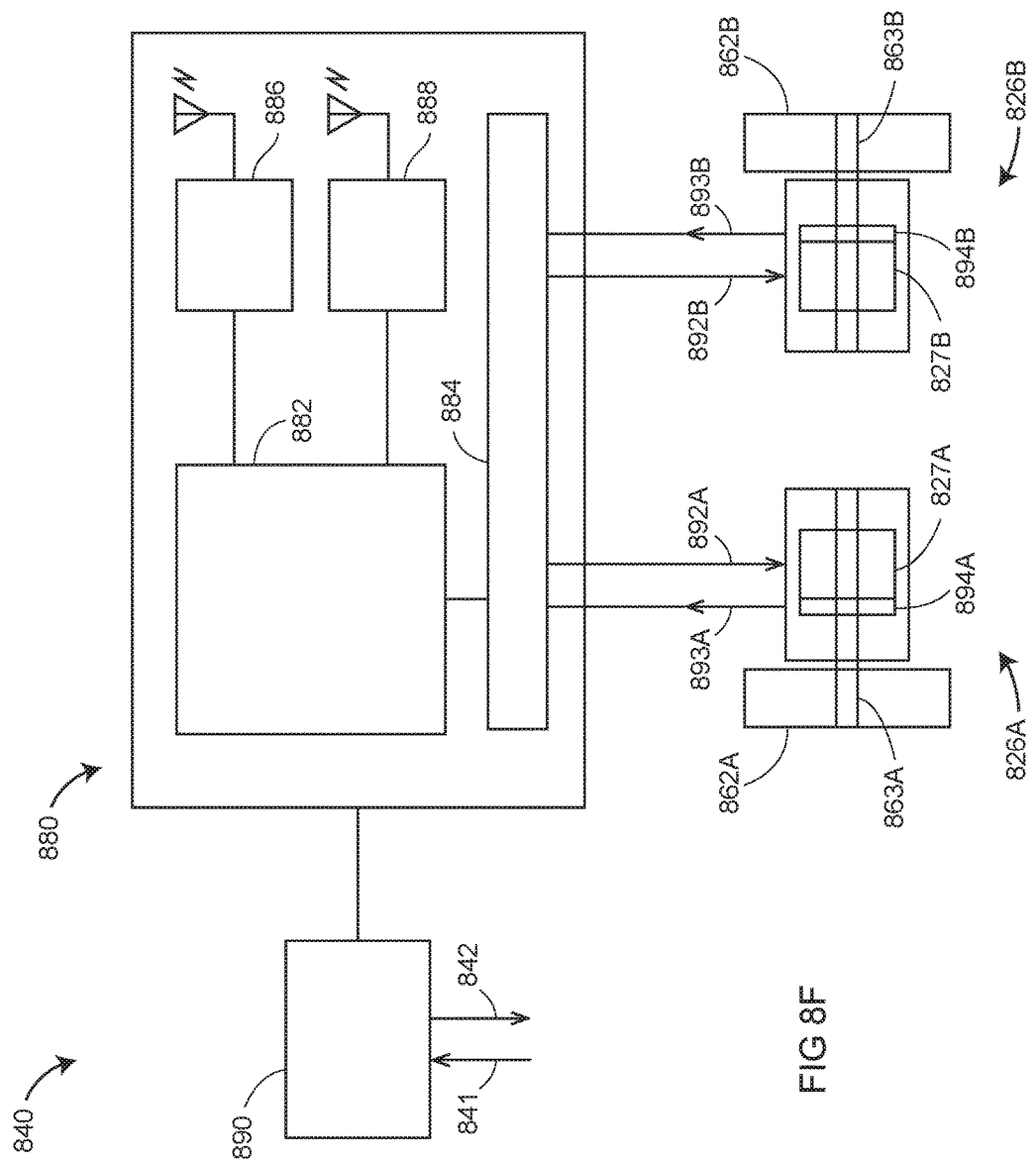
FIG. 8F is a schematic representation of electrical circuitry in the motorized dolly according to an embodiment.

Referring now to FIG. 8F, in an embodiment, control and power unit 840 includes a rechargeable battery 890 and an electrical circuit board 880 having a processor 882, a motor controller 884, an IEEE 802.11 (Wi-Fi) transceiver 886, and a cellular transceiver 888. In an embodiment, the cellular transceiver 888 supports 3G and long-term evolution (LTE) formats. In an embodiment, a first power plug 841 enables recharging of the rechargeable battery 890 from an AC power source and a second power plug 842 provides output power from the battery. In an embodiment, the processor 882 is an Intel NUC processor such as might be found in a personal computer. The Intel NUC processor is manufactured by Intel Corporation, with headquarters in Santa Clara, Calif. In an embodiment, the motor controller 884 is a Pololu RoboClaw 2x60A motor controller, manufactured by Pololu Robotics and Electronics with headquarters in Las Vegas, Nev. In an embodiment, the motor controller 884 controls the speed of each wheel 862A, 862B by sending digital signals 892A, 892B to of the motor assemblies 826A, 826B over a USB interface configured to act as a virtual serial (COM) port. In an embodiment, the motor assemblies 826A, 826B include rotary encoders 894A, 894B that measure the rotation of the wheels 862A, 862B and send encoder signals 893A, 893B to the motor controller 884. Rotary encoder signals indicate the angle of rotation of the wheels, from which speed and distance of travel may be calculated by the processor 882. The encoders 894A, 894B can be used as odometers to keep track of the total distance traveled by the mobile 3D measuring system 800. In other embodiments, other types of odometry sensors are used.

In an embodiment, conventional wheels such as 862A, 862B are driven differentially by the separate motor assemblies 826A, 826B. If the electrical signals provided by the controller are set to keep the rate of rotation of the two wheels the same, the motorized tripod assembly 810 will travel in a straight line. If the electrical signals provide rotation to one wheel but hold the other wheel locked, the motorized tripod assembly 810 will turn about the fixed wheel. Because of differences in the two motors and the differences in frictional profiles of the two wheels, there may be a tendency for the motorized tripod assembly 810 to turn one direction or the other during travel rather than traveling in a straight line. This tendency to turn can be corrected based on feedback provided by rotary encoders 894A, 894B in the motor assemblies 826A and 826B. In an alternative embodiment, conventional wheels are replaced with wheels that may be driven sideways as well as straight ahead. Examples of such wheels include omni wheels and Mecanum wheels.

In an embodiment, the control and power unit 840 is attached to the dolly legs 822 using a wing nut 852 and bolt 854 on one side, as shown in FIG. 8A, and a hook 856 and eye 858 on the other side, as shown in FIG. 8C. In an embodiment, the control and power unit 840 includes power outlets 872, such as those shown in FIG. 8A, to provide power to accessories such as a 2D laser scanner, a triangulation scanner such as a Kinect, a 2D camera, a depth camera, or an ultrasound sensor. The Kinect device is manufactured by Microsoft Corporation, with headquarters in Redmond, Wash. A fan 877 is provided to ensure cool operation of the unit 840. In an embodiment, the battery 890 is configured to provide power to the laser scanner 20 over the power outlet 878 should the battery of the scanner 20 run low. The power outlet 879 may be further configured to receive power to recharge the rechargeable battery 890.

In an embodiment, the motorized dolly may be folded into a compact package 895 as shown in FIG. 8E. To obtain the folded shape, the tripod 812 is removed from the motorized dolly 820, and the dolly legs 822 that have the large wheels are folded inward toward the dolly leg 822 that has the small wheel. In an embodiment, a motorized dolly weighs approximately 1.5 kg.

In the embodiment of FIGS. 8B, 8C, and 8D, extenders 897A, 897B are attached to motor assemblies 826A, 826B. The purpose of the extenders is to provide a location on which to attach accessory devices such as a 2D scanner, a triangulation scanner (for example, a Kinect or similar device), a 2D camera or a camera capable of measuring depth as well as two angles. In an embodiment, the extenders 897A, 897B are connected together to make one long extender region. In an embodiment, a vertical extender is attached to the single long extender. An advantage of attaching accessory devices to extenders rather than tripod legs is that extenders can be consistently aimed in the direction of movement of the system 800. In cases of obstacle avoidance, this is the preferred direction for the sensor. In other embodiments, accessory devices are attached to the 3D measuring device 20. For example, the element 66 in FIG. 1 may be an accessory device.

In a first mode, a smart device such as a smartphone, tablet, or notebook connects to the Wi-Fi network through a wireless access point. In a second mode, referred to as a client mode, both the unit 840 and a smart device connect to an external network. In a third mode, the unit 840 and a smart device connect to the internet through a cellular channel such as 3G or LTE.

A smart device such as a smartphone, tablet, or notebook is used to control the mobile 3D measuring system 800 by running an app that may have been downloaded from an app store. The app may include a touchscreen display that provides sensitive joystick control for moving of the 3D measuring system. The app may also control measuring and processing of data. Processing of data may also be handed off to an external computer, for example, to one or more servers located on a network. In an embodiment, the app permits locking or unlocking of the motorized wheels when power is not applied. As stated herein above, one wheel may be locked when a turn is executed. On the other hand, if the 3D measuring system is pushed by hand, it is convenient to unlock the wheels.

The mobile 3D measuring system 800 includes the motorized dolly 820, which has useful features of simplicity, adaptability, small size, and light weight. Methods described herein below may use the mobile 3D measuring system 800. Other embodiments of the methods described herein below may use other types of motorized 3D measuring systems.

Figures that accompany descriptions of the methods given herein below usually include the 3D measuring system 800, but it should be understood that alternative motorized platforms may be used. For example, the motorized dolly 820 may be configured to include four or more wheels. In an embodiment, the dolly 820 may be configured to move in a first direction (e.g. forward), a second direction opposite that of the first direction (e.g. backward) and also rotate about an axis, such as an axis passing centrally through the dolly 820 perpendicular to the surface upon which the dolly 820 rests.

In a common situation, the system 800 is used to make several measurements at a plurality of locations. The 3D point clouds obtained at the plurality of locations are then registered together. In some embodiments, an operator may use personal judgment in deciding the optimum locations of the mobile 3D measuring system 800 to obtain good registrations. In other embodiments, additional measuring and computing devices may be used to help select optimal measurement locations and ensure good registrations. Four examples of using measuring and computing devices to help select optimal measurement locations and ensure good registrations are described in U.S. patent application Ser. Nos. 14/559,290, 14/559,311, 14/559,335, and 14/559,367, all to Zweigle et al., the contents all of which are incorporated by reference.

Figure 9A:
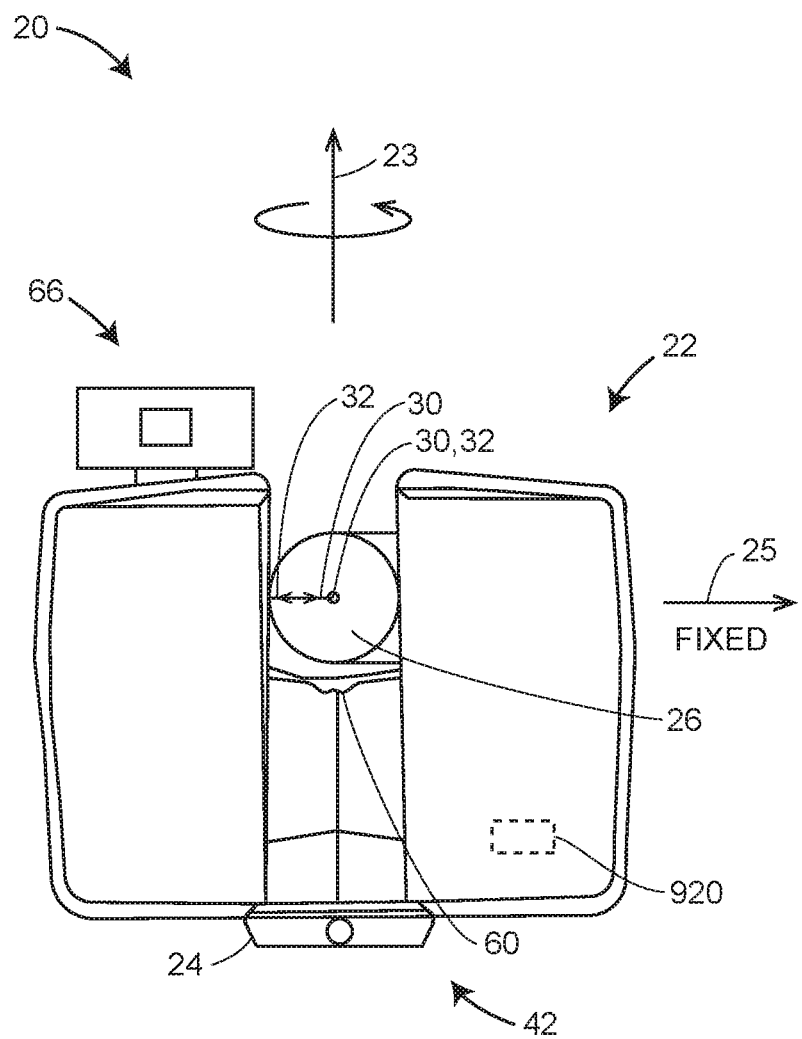
FIG. 9A is a front view of a 3D scanner configured to project light onto a horizontal plane according to an embodiment.
Figure 9B:
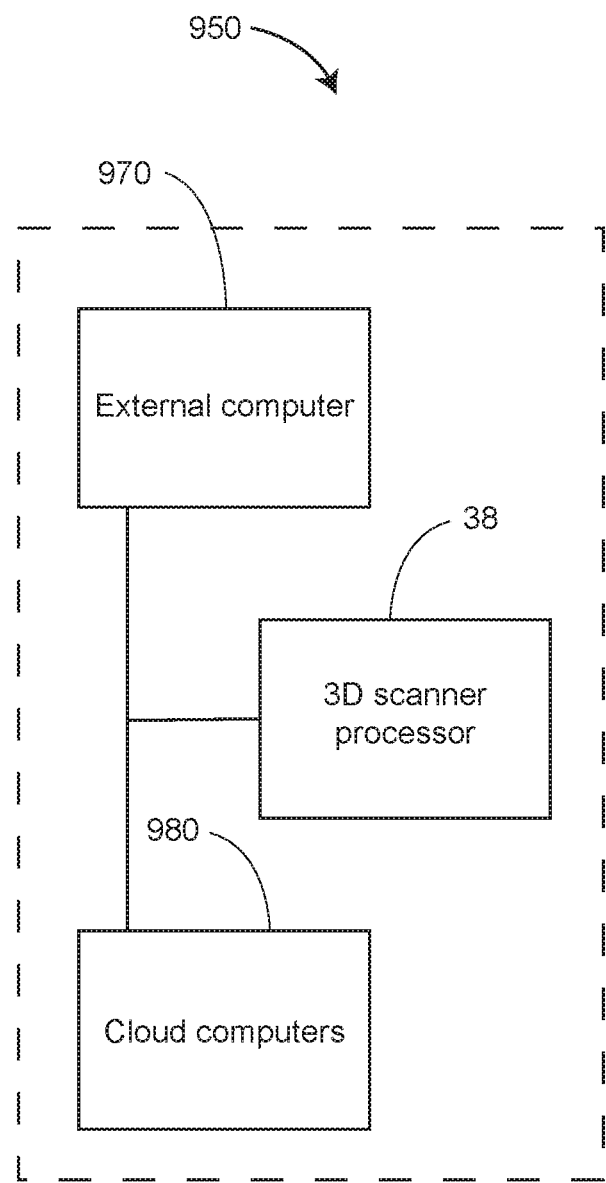
FIG. 9B is a block diagram depicting a processor system according to an embodiment.
Figure 11:
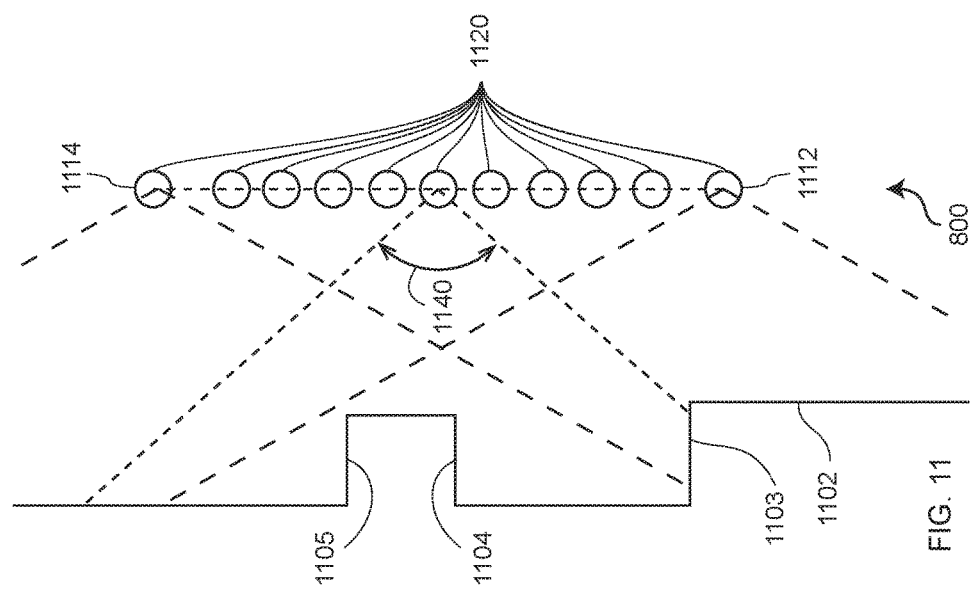
FIG. 11 is a schematic representation of a 3D scanner measuring the object by scanning along a horizontal plane from a plurality of intermediate positions according to an embodiment.

A first example of using measuring and computing devices to help select optimal measurement locations and ensure good registrations is now described with reference to FIGS. 9 to 14. FIGS. 9A and 9B show elements incorporated in an embodiment of a mobile 3D measuring system 800. The embodiment includes a 3D scanner 20 and a processor system 950.

The processor system 950 includes one or more processing elements, which may include a 3D scanner processor (controller) 38, an external computer 970, and a cloud computer 980. The processors may be microprocessors, field programmable gate arrays (FPGAs), digital signal processors (DSPs), and generally any device capable of performing computing functions. The one or more processors have access to memory for storing information. In an embodiment illustrated in FIG. 9B, the controller 38 represents one or more processors distributed throughout the 3D scanner 20. Also included in the embodiment of FIG. 9B are an external computer 970 and one or more cloud computers 980 for remote computing capability. In an alternative embodiment, only one or two of the processors 38, 970, and 980 is provided in the processor system. Communication among the processors may be through wired links, wireless links, or a combination of wired and wireless links. In an embodiment, scan results are uploaded after each scanning session to the cloud (remote network) for storage and future use. In addition, the processor system 950 cooperates with processors and other electrical components in the control and power unit 840 of the mobile 3D measuring system 800.

In one mode of operation the 3D scanner 20 measures 2D coordinates in a horizontal plane. In most cases, it does this by steering light within a horizontal plane to illuminate object points in the environment. It collects the reflected (scattered) light from the object points to determine 2D coordinates of the object points in the horizontal plane. In an embodiment, the 3D scanner scans a spot of light and measures the angle of rotation about the axis 23 with an angular encoder while at the same time measuring a corresponding distance value to each illuminated object point in the horizontal plane. The 3D scanner 23 may rotate about the axis 23 at a relatively high speed while performing no rotation about the axis 25. In an embodiment, the laser power emitted from the scanner 20 is set to fall within eye safety limits.

An optional position/orientation sensor 920 in the 3D scanner 20 may include inclinometers (accelerometers), gyroscopes, magnetometers, and altimeters. Usually devices that include one or more of an inclinometer and gyroscope are referred to as an inertial measurement unit (IMU). In some cases, the term IMU is used in a broader sense to include a variety of additional devices that indicate position and/or orientation—for example, magnetometers that indicate heading based on changes in magnetic field direction relative to the earth's magnetic north and altimeters that indicate altitude (height). An example of a widely used altimeter is a pressure sensor. By combining readings from a combination of position/orientation sensors with a fusion algorithm that may include a Kalman filter, relatively accurate position and orientation measurements can be obtained using relatively low-cost sensor devices. The motorized tripod assembly 810 enables the 3D measuring device 20 to be moved from place to place, typically along a floor that is approximately horizontal.

In an embodiment, in one mode of operation, the 3D scanner 20 is configured to scan a beam of light over a range of angles in a horizontal plane. At instants in time the 3D scanner 20 returns an angle reading and a corresponding distance reading to provide 2D coordinates of object points in the horizontal plane. In completing one scan over the full range of angles, the 3D scanner 20 returns a collection of paired angle and distance readings. As the mobile 3D measuring system 800 is moved from place to place, it continues to return 2D coordinate values in a horizontal plane. These 2D coordinate values are used to locate the position of the 3D scanner 20 at each stationary registration position, thereby enabling more accurate registration.

Figure 10:
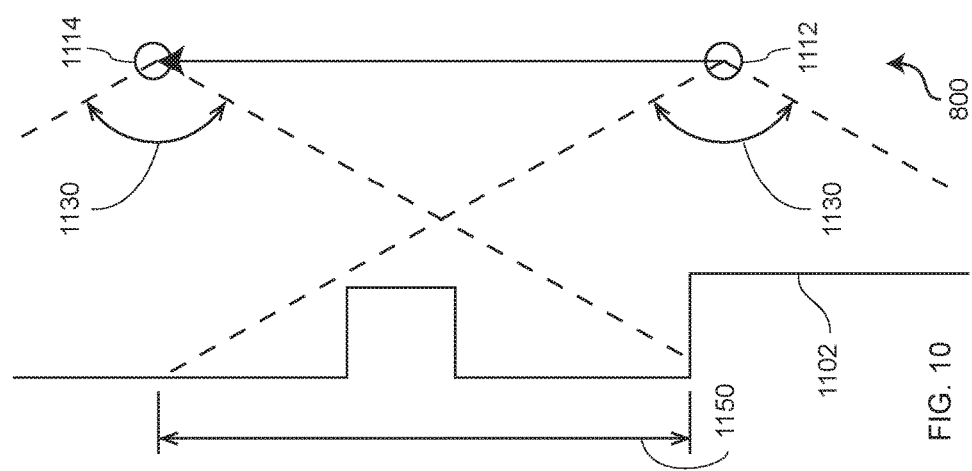
FIG. 10 is a schematic representation of a 3D scanner measuring an object from two registration positions according to an embodiment.

FIG. 10 shows the mobile 3D measuring system 800 moved to a first registration position 1112 in front of an object 1102 that is to be measured. The object 1102 might for example be a wall in a room. The motorized tripod assembly 810 is brought to a stop with the wheels held stationary. The 3D scanner 20 in the mobile 3D measuring system 800 takes a first 3D scan of the object 1102. In an embodiment, the 3D scanner 20 may if desired obtain 3D measurements in all directions except in downward directions blocked by the structure of the 3D measuring device 800. However, in the example of FIG. 10, in which 3D scanner 20 measures a long, mostly flat structure 1102, a smaller effective FOV 1130 may be selected to provide a more face-on view of features on the structure.

When the first 3D scan is completed, the processor system 950 causes the 3D scanner 20 to change from 3D scanning mode to 2D scanning mode. In an embodiment, it does this by fixing the mirror 26 to direct the outgoing beam 30 on a horizontal plane. The mirror 26 receives reflected light 32 traveling in the reverse direction. In an embodiment, the scanner begins the 2D scan as soon as the 3D scanning stops. In another embodiment, the 2D scan starts when the processor receives a signal such as a signal form the position/orientation sensor 920, a signal from a brake release sensor, or a signal sent in response to a command from an operator. The 3D scanner 20 may start to collect 2D scan data when the mobile 3D measuring system 800 starts to move. In an embodiment, the 2D scan data is sent to the processor system 950 as it is collected.

In an embodiment, the 2D scan data is collected as the mobile 3D measuring system 800 is moved toward the second registration position 1114. In an embodiment, 2D scan data is collected and processed as the 3D scanner 20 passes through a plurality of 2D measuring positions 1120. At each measuring position 1120, the 3D scanner collects 2D coordinate data over an effective FOV 1140. Using methods described in more detail below, the processor system 950 uses 2D scan data from the plurality of 2D scans at positions 1120 to determine a position and orientation of the 3D scanner 20 at the second registration position 1114 relative to the first registration position 1112, where the first registration position and the second registration position are known in a 3D coordinate system common to both. In an embodiment, the common coordinate system is represented by 2D Cartesian coordinates x, y and by an angle of rotation θ relative to the x or y axis. In an embodiment, the x and y axes lie in the horizontal x-y plane of the 3D scanner 20 and may be further based on a direction of a "front" of the 3D scanner 20. An example of such an (x, y, θ) coordinate system is the coordinate system 1410 of FIG. 14A.

On the object 1102, there is a region of overlap 1150 between the first 3D scan (collected at the first registration position 1112) and the second 3D scan (collected at the second registration position 1114). In the overlap region 1150 there are registration targets (which may be natural features of the object 1102) that are seen in both the first 3D scan and the second 3D scan. A problem that often occurs in practice is that, in moving the 3D scanner 20 from the first registration position 1112 to the second registration position 1114, the processor system 950 loses track of the position and orientation of the 3D scanner 20 and hence is unable to correctly associate the registration targets in the overlap regions to enable the registration procedure to be performed reliably. By using the succession of 2D scans, the processor system 950 is able to determine the position and orientation of the 3D scanner 20 at the second registration position 1114 relative to the first registration position 1112. This information enables the processor system 950 to correctly match registration targets in the region of overlap 1150, thereby enabling the registration procedure to be properly completed.

Figure 12:
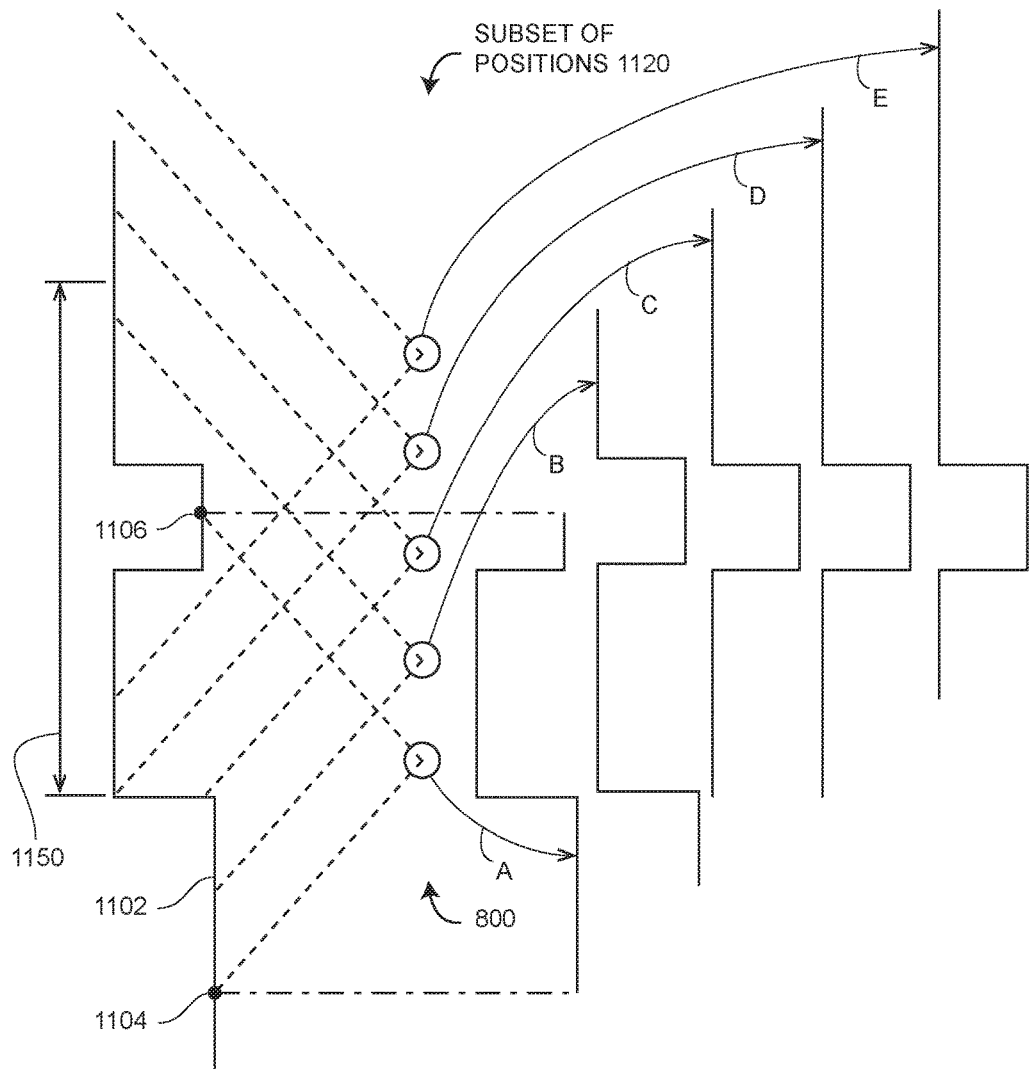
FIG. 12 shows a 3D scanner capturing portions of the object by scanning along a horizontal plane from a plurality of positions according to an embodiment.

FIG. 12 shows the 3D scanner 20 collecting 2D scan data at selected positions 1120 over an effective FOV 1140. At different positions 1120, the 3D scanner captures 2D scan data over a portion of the object 1102 marked A, B, C, D, and E. FIG. 12 shows the 3D scanner 20 moving in time relative to a fixed frame of reference of the object 1102.

Figure 13:
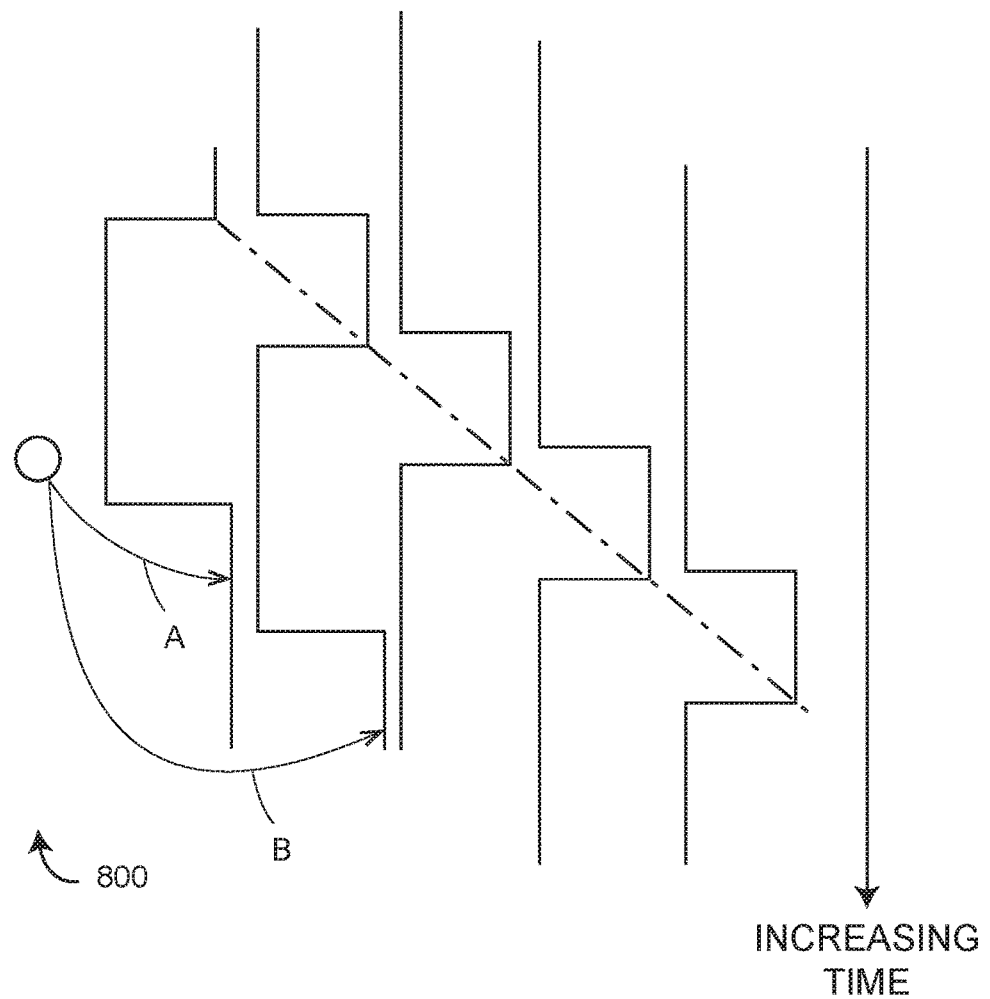
FIG. 13 shows the 3D scanner capturing portions of the object by scanning along a horizontal plane from a plurality of positions, as seen from a frame of reference of the 3D scanner, according to an embodiment.

FIG. 13 includes the same information as FIG. 12 but shows it from the frame of reference of the 3D scanner 20 while taking 2D scans rather than the frame of reference of the object 1102. This figure makes clear that in the scanner frame of reference, the position of features on the object change over time. Hence it is clear that the distance traveled by the 3D scanner 20 between registration position 1 and registration position 2 can be determined from the 2D scan data sent from the 3D scanner 20 to the processor system 950.

Figure 14A:
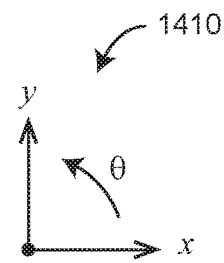
FIGS. 14A, 14B and 14C illustrate a method for finding changes in the position and orientation of the 3D scanner over time according to an embodiment.
Figure 14B:
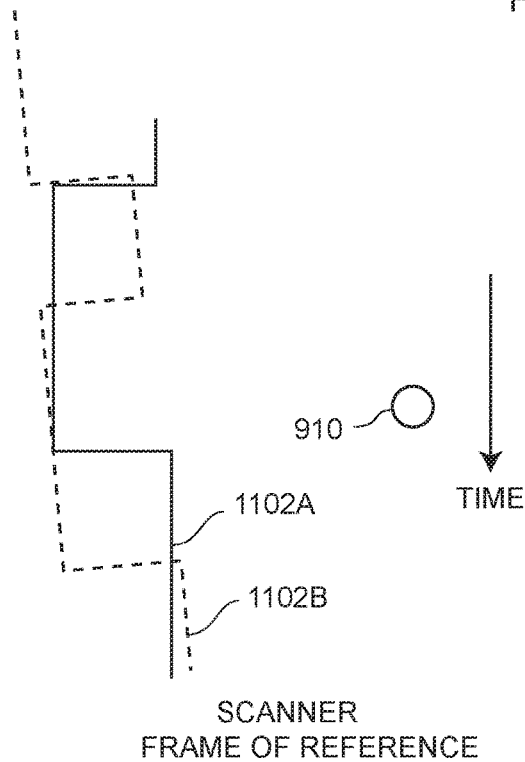
Figure 14C:
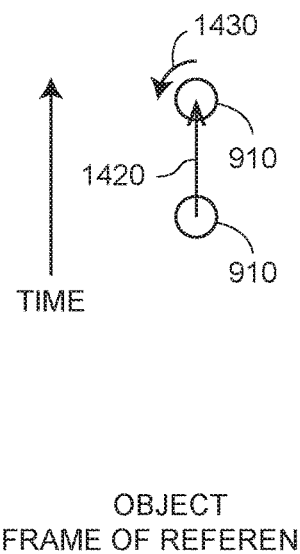

FIG. 14A shows a coordinate system that may be used in FIGS. 14B and 14C. In an embodiment, the 2D coordinates x and y are selected to lie on the plane in which the 2D scans are taken, ordinarily the horizontal plane. The angle θ is selected as a rotation angle in the plane, the rotation angle relative to an axis such as x or y. FIGS. 14B, 14C represent a realistic case in which the 3D scanner 20 is moved not exactly on a straight line, for example, nominally parallel to the object 1102, but also to the side. Furthermore, the 3D scanner 20 may be rotated as it is moved.

FIG. 14B shows the movement of the object 1102 as seen from the frame of reference of the 3D scanner 20 in traveling from the first registration position to the second registration position. In the scanner frame of reference (that is, as seen from the scanner's point of view), the object 1102 is moving while the 3D scanner 20 is fixed in place. In this frame of reference, the portions of the object 1102 seen by the 3D scanner 20 appear to translate and rotate in time. The 3D scanner 20 provides a succession of such translated and rotated 2D scans to the processor system 950. In the example shown in FIGS. 14A, B, the scanner translates in the +y direction by a distance 1420 shown in FIG. 14B and rotates by an angle 1430, which in this example is +5 degrees. Of course, the scanner could equally well have moved in the +x or −x direction. To determine the movement of the 3D scanner 20 in the x, y, θ directions, the processor system 950 uses the data recorded in successive horizontal scans as seen in the frame of reference of the scanner 20, as shown in FIG. 14B. In an embodiment, the processor system 950 performs a best-fit calculation using methods well known in the art to match the two scans or features in the two scans as closely as possible.

As the 3D scanner 20 takes successive 2D readings and performs best-fit calculations, the processor system 950 keeps track of the translation and rotation of the 3D scanner 20. In this way, the processor system 950 is able to accurately determine the change in the values of x, y, θ as the mobile 3D measuring system 800 moves from the first registration position 1112 to the second registration position 1114.

It is important to understand that the processor system 950 determines the position and orientation of the 3D measuring device 800 based on a comparison of the succession of 2D scans and not on fusion of the 2D scan data with 3D scan data provided by the 3D scanner 20 at the first registration position 1112 or the second registration position 1114.

Instead, the processor system 950 is configured to determine a first translation value, a second translation value, and a first rotation value that, when applied to a combination of the first 2D scan data and second 2D scan data, results in transformed first 2D data that matches transformed second 2D data as closely as possible according to an objective mathematical criterion. In general, the translation and rotation may be applied to the first scan data, the second scan data, or to a combination of the two. For example, a translation applied to the first data set is equivalent to a negative of the translation applied to the second data set in the sense that both actions produce the same match in the transformed data sets. An example of an "objective mathematical criterion" is that of minimizing the sum of squared residual errors for those portions of the scan data judged to overlap. Another type of objective mathematical criterion may involve a matching of multiple features identified on the object. For example, such features might be the edge transitions 1103, 1104, and 1105 shown in FIG. 11. The mathematical criterion may involve processing of the raw 2D scan data provided by the 3D scanner 20 to the processor system 950, or it may involve a first intermediate level of processing in which features are represented as a collection of line segments using methods that are known in the art, for example, methods based on the Iterative Closest Point (ICP). Such a method based on ICP is described in Censi, A., "An ICP variant using a point-to-line metric," IEEE International Conference on Robotics and Automation (ICRA) 2008.

In an embodiment, the first translation value is dx, the second translation value is dy, and the first rotation value dθ. If first 2D scan data has translational and rotational coordinates (in a reference coordinate system) of $(x_1, y_1, \theta_1)$, then the second 2D scan data collected at a second location has coordinates given by $(x_2, y_2, \theta_2)=(x_1+dx, y_1+dy, \theta_1+d\theta)$. In an embodiment, the processor system 950 is further configured to determine a third translation value (for example, dz) and a second and third rotation values (for example, pitch and roll). The third translation value, second rotation value, and third rotation value may be determined based at least in part on readings from the position/orientation sensor 920.

The 3D scanner 20 collects 2D scan data at the first registration position 1112 and more 2D scan data at the second registration position 1114. In some cases, these 2D scans may suffice to determine the position and orientation of the 3D measuring device at the second registration position 1114 relative to the first registration position 1112. In other cases, the two sets of 2D scan data are not sufficient to enable the processor system 950 to accurately determine the first translation value, the second translation value, and the first rotation value. This problem may be avoided by collecting 2D scan data at intermediate scan locations 1120. In an embodiment, the 2D scan data is collected and processed at regular intervals, for example, once per second. In this way, features are easily identified in successive 2D scans 1120. If more than two 2D scans are obtained, the processor system 950 may choose to use the information from all the successive 2D scans in determining the translation and rotation values in moving from the first registration position 1112 to the second registration position 1114. Alternatively, the processor may choose to use only the first and last scans in the final calculation, simply using the intermediate 2D scans to ensure proper correspondence of matching features. In most cases, accuracy of matching is improved by incorporating information from multiple successive 2D scans.

The mobile 3D measuring system 800 is moved to the second registration position 1114. In an embodiment, the mobile 3D measuring system 800 is brought to a stop and brakes fixed to hold the 3D scanner stationary. In an alternative embodiment, the processor system 950 starts the 3D scan automatically when the moveable platform is brought to a stop, for example, by the position/orientation sensor 920 noting the lack of movement. The 3D scanner 20 in the mobile 3D measuring system 800 takes a 3D scan of the object 1102. This 3D scan is referred to as the second 3D scan to distinguish it from the first 3D scan taken at the first registration position.

The processor system 950 applies the already calculated first translation value, the second translation value, and the first rotation value to adjust the position and orientation of the second 3D scan relative to the first 3D scan. This adjustment, which may be considered to provide a "first alignment," brings the registration targets (which may be natural features in the overlap region 1150) into close proximity. The processor system 950 performs a fine registration in which it makes fine adjustments to the six degrees of freedom of the second 3D scan relative to the first 3D scan. It makes the fine adjustment based on an objective mathematical criterion, which may be the same as or different than the mathematical criterion applied to the 2D scan data. For example, the objective mathematical criterion may be that of minimizing the sum of squared residual errors for those portions of the scan data judged to overlap. Alternatively, the objective mathematical criterion may be applied to a plurality of features in the overlap region. The mathematical calculations in the registration may be applied to raw 3D scan data or to geometrical representations of the 3D scan data, for example, by a collection of line segments.

Outside the overlap region 1150, the aligned values of the first 3D scan and the second 3D scan are combined in a registered 3D data set. Inside the overlap region, the 3D scan values included in the registered 3D data set are based on some combination of 3D scanner data from the aligned values of the first 3D scan and the second 3D scan.

A second example of using measuring and computing devices to help select optimal measurement locations and ensure good registrations is the same as the first example described hereinabove with reference to FIGS. 9-14 except that the measurements in a horizontal plane are made with a 2D laser scanner rather than by the laser scanner 20 according to the method described with reference to FIG. 9A. The 2D laser scanner in this second example provides the same information as the 3D laser scanner 20 measuring over a horizontal plane. In an embodiment, the 2D scanner is placed directly under the 3D scanner 20 and on top of the motorized tripod assembly 810.

Examples of 2D scanners that might be included in the 2D scanner accessory include 2D scanners from the SICK LMS100 product family and 2D scanners from Hoyuko such as the Hoyuko models URG-04LX-UG01 and UTM-30LX. The 2D scanners from SICK are manufactured by SICK AG, with headquarters in Waldkirch, Germany. The Hoyuko scanners are manufactured by Hokuyo Automatic Company, Ltd, with headquarters in Osaka, Japan. The scanners in the Sick LMS100 family measure angles over a 270 degree range and over distances up to 20 meters. The Hoyuko model URG-04LX-UG01 is a low-cost 2D scanner that measures angles over a 240 degree range and distances up to 4 meters. The Hoyuko model UTM-30LX is a 2D scanner that measures angles over a 270 degree range and to distances up to 30 meters. Many other types of 2D scanners are also available.

A third example of using measuring and computing devices to help select optimal measurement locations and ensure good registrations is now given with reference to FIGS. 3 and 8A. Mobile 3D measuring device 800 includes a 3D scanner 20, a processor system 950, a motorized dolly 820, and a 2D camera, which may be a camera 112 internal to the 3D scanner (as shown in FIG. 3), a camera 66 mounted on the 3D scanner (as shown in FIG. 1), or a camera mounted on the motorized dolly 820.

In one mode of operation of the 3D measuring device 800, the camera (112 or 66) captures overlapping 2D camera images as the 3D measuring device is moved between positions at which 3D scans are taken. For the case in which the camera is an internal camera (such as the central color camera 112) or a camera 66 mounted on the measuring head 22, the camera may be optionally steered about the vertical axis 23 to increase the effective FOV of the camera. In an embodiment, the laser power is turned off as the 2D camera images are collected. In an alternative embodiment, the laser power is left on so that the 3D scanner may make 2D scans in a horizontal plane while the 2D camera images are collected.

The procedure carried out according to the third example is similar to that of the first two except that the change in distance and orientation is based on the information from the plurality of 2D imaging data rather than from the data obtained from the 2D scanner or 3D scanner in a horizontal plane. As in the first and second examples, the change in position and orientation is tracked by the 2D cameras to provide a good starting point for the second registration of the data collected by the 3D scanner in the first and second registration positions. As in the previous cases, 2D and 3D data are not fused to determine the starting position and orientation for the mathematical registration procedure. The distance and orientation change from the first and second position may be based on a mathematical method such as "optical flow" described in "Mathematical Models in Computer Vision: The Handbook" by N. Paragios, Y. Chen, and O. Faugeras (editors), Chapter 15, Springer 2005, pp. 239-258, the contents of which are incorporated by reference herein.

In an embodiment, the camera imaging data is collected as the mobile 3D measuring device 800 is moved toward the second registration position 1114. In an embodiment, the camera imaging data is collected and processed as the 3D scanner 20 passes through a plurality of 2D measuring positions 1120. At each measuring position 1120, the camera collects camera imaging data over an effective FOV 1140. The processor system 950 uses the camera imaging data from a plurality of camera images at positions 1120 to determine a position and orientation of the 3D scanner 20 at the second registration position 1114 relative to the first registration position 1112, where the first registration position and the second registration position are known in a 3D coordinate system common to both. In an embodiment, the common coordinate system is represented by 2D Cartesian coordinates x, y and by an angle of rotation $\theta$ relative to the x or y axis. In an embodiment, the x and y axes lie in the horizontal x-y plane of the 3D scanner 20 and may be further based on a direction of a "front" of the 3D scanner 20. An example of such an (x, y, $\theta$) coordinate system is the coordinate system 1410 of FIG. 14A.

A fourth example of using measuring and computing devices to help select optimal measurement locations and ensure good registrations is now given for a mobile 3D measuring device 800 that includes a 3D scanner 20, a processor system 950, a motorized dolly 820, and a depth camera at locations discussed further below.

The depth camera may be either of two types: a central-element depth camera and a triangulation-based depth camera. A central-element depth camera uses a single integrated sensor element combined with an illumination element to determine distance ("depth") and angles from the camera to points on an object. One type of central-element depth camera uses a lens combined with a semiconductor chip to measure round-trip time of light travelling from the camera to the object and back. For example, the Microsoft Xbox One includes a Kinect depth camera that uses an infrared (IR) light source to illuminate a 640×480 pixel photosensitive array. This depth camera is used in parallel with a 640×480 pixel RGB camera that measures red, blue, and green colors. Infrared illumination is provided in the IR illuminators adjacent to the lens and IR array. Another example of a central-element depth camera includes a lens and a PMD Technologies PhotonICs 19k-S3 3D chip used in conjunction with an IR light source, the 3D chip manufactured by pmdtechnologies AG, with headquarters in Siegen, Germany. The measurement distance range of this 160×120 pixel chip is scalable based on the camera layout. Many other central-element depth cameras and associated IR sources are available today. Most central-element depth cameras include a modulated light source. The light source may use pulse modulation for direct determination of round-trip travel time. Alternatively, the light source may use continuous wave (CW) modulation with sinusoidal or rectangular waveforms to obtain round-trip travel time based on measured phase shift.

FIG. 8A shows two possible locations for a central-element depth camera. In an embodiment, the camera 66 is a central-element depth camera rather than a 2D camera. In this case, the depth camera 66 includes an integrated light source. In another embodiment, a central-element depth camera takes the place of central-color camera 112. In this case, the light source may be integrated into the central-depth camera package or placed near to it so that the illumination light passes through the dichroic beam splitter 118. Alternatively, the beam splitter 118 may not be a dichroic beam splitter but instead transmit and reflect wavelengths used by the central-element depth camera 112. In this case, the wavelengths used by the depth camera 112 may be sent from the launch 28, reflected off the beam splitter 118 onto the object, and reflected back from the object onto the depth camera. In an alternative embodiment, the central-element depth camera 840 is located on the motorized dolly 820.

The second type of depth camera is a triangulation-based depth camera. An example of such a camera is the Kinect of the Microsoft Xbox 360, which is a different Kinect than the Kinect of the Microsoft Xbox One described herein above. An IR light source on the Kinect of the Xbox 360 projects a pattern of light onto an object, which is imaged by an IR camera that includes a photosensitive array. The Kinect determines a correspondence between the projected pattern and the image received by the photosensitive array. It uses this information in a triangulation calculation to determine the distance to object points in the measurement volume. This calculation is based partly on the baseline between the projector and the IR camera and partly on the camera pattern received and projector pattern sent out. Unlike the central-element depth camera, a triangulation camera cannot be brought arbitrarily close to the light source (pattern projector) as accuracy is reduced with decreasing baseline distance. Many types of triangulation-based depth cameras are available.

Figure 15:
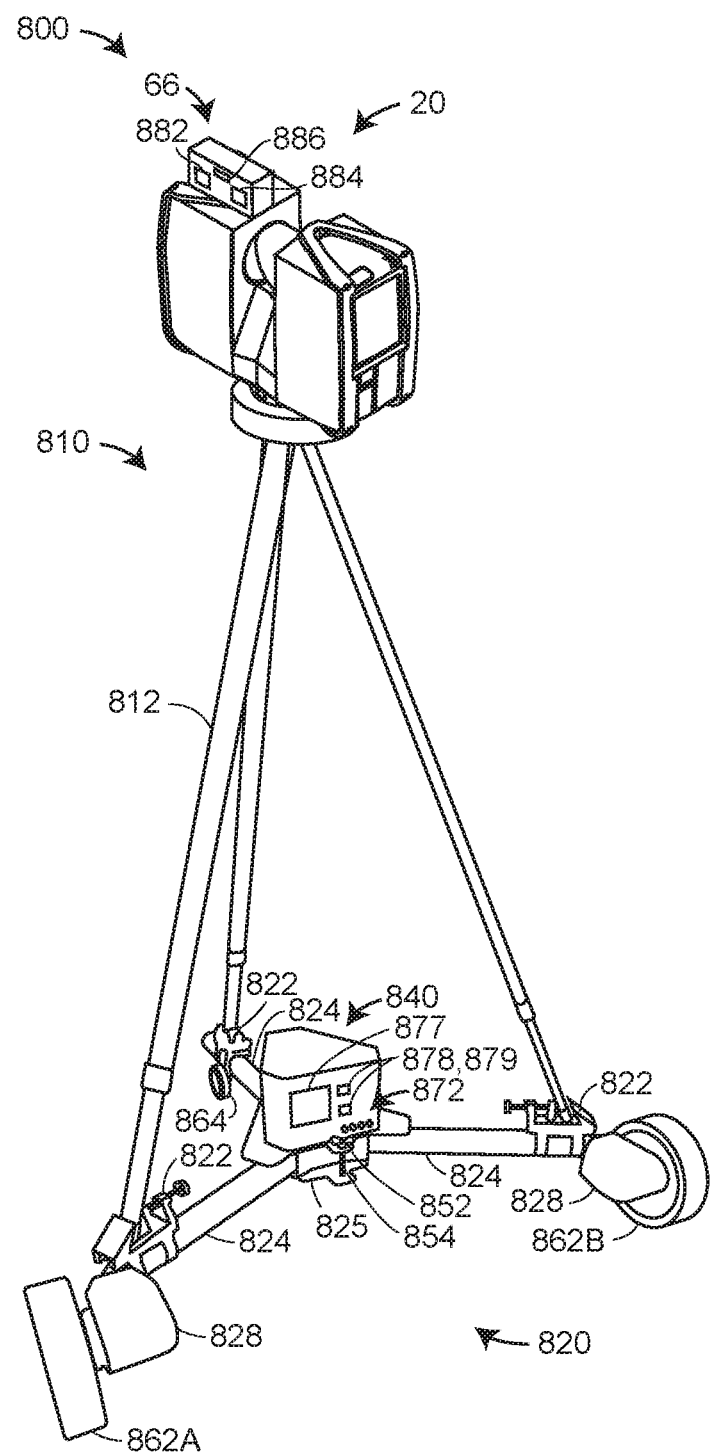
FIG. 15 is a perspective view of a mobile 3D measuring system according to an embodiment.

FIG. 15 shows a possible location for a triangulation-based depth camera 66. In an embodiment, the triangulation-based depth camera 66 is located on the 3D scanner 20. The depth camera 66 includes a camera 882 and a pattern projector 884. It may also include an optional color camera 886. In an alternative embodiment, the triangulation-based depth camera 870 is located on the motorized dolly 820. It is not generally possible to replace the central-color camera 112 with a triangulation-based depth camera because of the need for a baseline separation between the projector and the camera.

In one mode of operation of the mobile 3D measuring device 800, the depth camera (112, 66) captures overlapping depth-camera images as the 3D measuring device is moved between positions at which 3D scans are taken. For the case in which the depth camera is an internal camera (for example, in place of the central color camera 112) or a camera 66 mounted on the measuring head 22, the camera may be optionally steered about the vertical axis 23 to increase the effective FOV of the depth camera. In an embodiment, the laser power from the 3D scanner is turned off as the depth-camera images are collected. In an alternative embodiment, the laser power is left on so that the 3D scanner 20 may make 2D scans in a horizontal plane while the depth-camera images are collected. For the case in which the depth camera 840 is mounted on the moveable platform 820, the direction at which the depth camera is pointed is unaffected by rotation of horizontal axis 25 or vertical axis 23.

In an embodiment, the processor system 950 extracts a horizontal slice from the depth-camera image. The resulting 2D coordinates on the horizontal plane provides information of the sort shown in FIGS. 12-14. As in the case of the first three examples above, such information may be used to provide first and second translation values and a first rotation value to provide a good starting point for 3D registration.

For the case in which the depth camera is internal to the camera, for example, taking the place of central color camera 112, the light from depth-camera light source is sent off the mirror 26 and the scattered light is reflected off the object onto the mirror 26 and then onto the depth camera. In an embodiment, the mirror 26 is kept fixed about the horizontal axis 25 as shown in FIG. 9A.

In most cases, a single horizontal slice is sufficient to provide accurate first and second translation values and first rotation value. However, in the event that the scanned area is nearly featureless over the horizontal slice, other methods may be used. One method is to take multiple horizontal slices, each at a different height. A scanned region that is nearly featureless at one height may include several features at a different height. Alternatively, the method of optical flow described herein above may be used.

Methods for using the motorized dolly 820 with 3D measuring devices such as the mobile 3D measuring system 800 are now given, with emphasis on applications in which such methods may be advantageously used. Applications discussed herein below include (1) monitoring of changes in a flexible factory; (2) accurate measuring of objects over large areas and from all directions; (3) providing assistance in building construction.

In the past, most manufacturing plants have been based on fixed assemblies lines or manufacturing cells. In such plants, the lines or cells are fixed in place and seldom moved or modified. In most cases, aisle ways are kept wide and fixed so that parts can be delivered and equipment moved according to a prescribed schedule. Today, efforts are underway to make manufacturing plants more flexible, thereby enabling customization to be carried out more easily and changes to be made more quickly and with lower costs. Such factories may use moveable assembly surfaces or overhead carrying mechanisms instead of fixed assembly lines and cells. Such flexible assembly necessitates a more flexible method of delivering parts needed for production according to the latest orders or production forecast. Parts may be stocked relatively close to the assembly areas to minimize time required to deliver the parts to the assembly areas. Parts may be delivered to an assembly area frequently and in small batches. Small carriers may move in relatively narrow and changing aisle ways to deliver the needed parts to the flexible manufacturing stations.

Robots used in assembly lines today, for example, in automotive factories, are usually considered unsafe to use near humans and hence are isolated in separate areas that are expensive to equip and inflexible. In contrast, a flexible factory of the future may emphasize the use of smaller, less powerful, human friendly robots that may safely work next to humans. Such human friendly robots can more easily be taught to do required measurement tasks than robots of the past, which generally required elaborate programming and verification procedures.

The operations of the factory of the future will be managed through a computer network that will require information on current status of factory layout and parts stocking to ensure that operations run smoothly. To some extent, such information may be provided by a network of cameras located on ceilings and walls, for example, but there is a need for more detailed information on dimensional layouts and parts inventory than can be provided by an ordinary camera network.

In an embodiment, the mobile 3D measuring system 800 is used to monitor factory layout and inventory in stock. A mobile 3D measuring system 800 that includes a 3D laser scanner 20 may move along aisle ways in a factory, determining the location and size of aisle ways, the location and size of manufacturing areas, and the location and size of inventory areas. The aisle ways may be curved or may end abruptly to be continued on the other side of a blockage. The aisle ways may also be aisle ways nearer the ceiling than the floor for those cases in which assemblies are transported by chains or other devices attached to overhead mobile carriers. Inventory may include not only first level parts but also sub-assemblies.

Although the computer network may provide the mobile 3D measuring system 800 with information on the desired factory layout and parts availability, the current information may not be fully up-to-date or may simply be wrong. In traversing the factory floor, the mobile 3D measuring system 800 needs to rapidly determine its current location and identify elements of the factory such as assembly areas and inventory storage areas. In an embodiment, the 3D measuring system accurately determines the size, shape, and orientation of the assembly and inventory components. The mobile 3D measuring system 800 may also determine whether the elements of each assembly area are as expected—for example, whether the right robots and other equipment are present. The computer network uses this provided information to determine whether actions are needed to correct problems—for example, by opening up an aisle way, by replacing or moving an assembly function, or by changing production rates or parts delivery information according to the information provided. In some cases, the information provided by the mobile 3D measuring system 800 may indicate that human intervention is needed to ensure smooth running of operations.

In an embodiment, the mobile 3D measuring system 800 uses one of the registration methods given in the first through fourth examples given above (as further referenced in U.S. patent application Ser. Nos. 14/559,290, 14/559,311, 14/559,335, and 14/559,367). Such methods enable the mobile 3D measuring system to accurately and efficiently register multiple 3D point clouds collected by the 3D scanner 20. In other embodiments, other registration methods are used.

In an embodiment, the computer network provides the mobile 3D measuring system 800 with electronic information on the environment. Such electronic information may include a description of each factory assembly area, each inventory storage area, and each aisle way. Information on each factory assembly area may include dimensional information, which may include overall dimensions as well as a description of components included in each factory assembly area and observable physical features of each factory assembly area. In an embodiment, the computer network provides the mobile 3D measuring system 800 with expected dimensions of aisle ways and inventory storage areas.

In an embodiment, the mobile 3D measuring system 800 is configured to move safely around a factory environment in the presence of humans. In an embodiment, the speed of the 3D measuring system 800 is kept to less than one meter per second, which is a speed generally considered to pose a minimal risk of injury from collision. In an embodiment, the mobile 3D measuring system 800 includes sensors that monitor the presence of humans or other objects in the direction of movement of the system 800, thereby enabling avoidance of collisions with people or other objects. Examples of sensors suitable for this purpose are a 2D laser scanner; a 3D laser scanner 20 used in a horizontal rotation mode as described with reference to FIG. 9A; a 2D camera used with optical flow or other suitable algorithm; a 3D depth camera, which might be a central-element depth camera or a triangulation-based depth camera; and an ultrasound sensor. An ultrasound sensor is useful when some objects in the factory are nearly transparent—for example, large sheets of glass. Other types of sensors may also be used to enable obstacle avoidance.

In an embodiment, the mobile 3D measuring system 800 is positioned in a factory environment and given instructions to move along available aisle ways to collect information on the factory layout and inventory as described herein above. In an embodiment, the computer network gives the mobile 3D measuring system 800 instructions to simply move along available aisle ways, mapping what is seen and delivering the observations to the computer network for analysis. In another embodiment, the computer network gives the mobile 3D measuring system 800 instructions to move along particular aisle ways to collect desired information, which is then provided to the computer. In another embodiment, the computer network provides the mobile 3D measuring system 800 with electronic information on the factory. Such electronic information may include size, placement, features, and contents of assembly areas and inventory areas, and geometry of the factory as a whole, including aisle ways. If overhead spaces are used for manufacturing or delivery of materials, the computer network may also provide this information to the mobile 3D measuring system 800.

In most cases, it is advantageous for the computer network to give considerable electronic information to the mobile 3D measuring system 800 since the system 800 may carry out most of the required calculations and simply deliver to the computer network that information considered important by the computer network. For this situation, the mobile 3D measuring system 800 needs to determine its initial position within the factory in relation to the layout information provided by computer network. In one embodiment, the mobile 3D measuring system determines its initial position by moving along a clear unobstructed passage of the path in an aisle way, observing the dimensions and features in the surroundings, and matching the dimensions and features to those observed in the surroundings. The initial position is then determined retrospectively based on the information that had been collected before a matching of the surroundings was achieved. This method presupposes that the factory environment changes relatively slowly so that the mobile 3D measuring system 800 is able to recognize the overall geometry of assembly areas, inventory areas, and aisle ways in the factory, even if some of the geometry has changed. Once the mobile 3D measuring system has determined its position in relation to the geometry in the electronic information provided by the computer network, it knows its position and orientation and may move accurately about its environment, noting any changes that may have occurred relative to the electronic file.

In an alternative embodiment, external systems are used to determine the position and orientation of the mobile 3D measuring system 800. Such an external system may enable faster movement of the mobile 3D measuring system 800 through the factory since the mobile 3D measuring system 800 does not have to stop periodically to take a scan to reestablish its position and orientation through registration. Instead, it can simply go to any area the computer network considers to be in need of investigation, its movement guided by the external system. In addition, the initial position and orientation of the mobile 3D measuring system 800 may be determined relatively quickly, thereby eliminating the need to have the system 800 move far enough and take enough measurements to determine the initial position. Another potential advantage of an external system is improved accuracy since an external system may provide a more accurate knowledge of the position and orientation of the mobile 3D measuring system 800 than would otherwise be available.

Several types of external systems may be used to establish the position and orientation of the mobile 3D measuring system 800 within the environment. In a first embodiment, external sensors are mounted on the environment surrounding the mobile 3D measuring system 800. Such sensors may measure distances, angles, or a combination of distances and angles to markers (also referred to as targets) located on the mobile 3D measuring system 800. In a first embodiment, sensors include at least one 2D camera that measures angles in two directions. In an embodiment, the markers on the mobile 3D measuring system 800 are light sources such as light emitting diodes (LEDs) 1630 illustrated in FIG. 16. If accuracy in finding the position and orientation of the mobile 3D measuring system 800 is not too important, a single LED may be placed on the mobile 3D measuring system 800. In most cases, it is advantageous to place at least three non-collinear LEDs on the mobile 3D measuring system 800. A fourth LED may be advantageously placed on the mobile 3D measuring system 800 at a position off the plane that holds the first three LEDs. The markers (which might be LEDs) may be placed on the body of the 3D scanner 20 or on other parts of the mobile 3D measuring system 800 such as on the legs 812 of the tripod or on the moveable dolly 820. In determining an accurate position and orientation of the mobile 3D measuring system 800, it is helpful for the imaged markers to cover a relatively large portion of the camera image sensor. For relatively wide-angle cameras or cameras relatively far away from the mobile 3D measuring system 800, it can be useful to place the markers over the extent of the motorized tripod assembly 810 as well as on the 3D scanner 20. A technique that can be used to further improve the accuracy of the position and orientation of the mobile 3D measuring system 800 is to rotate the 3D scanner 20 about the axis 23 or 25 shown in FIG. 1. Since the relative positions of the LEDs can be established relative to the gimbal point 27 of the 3D scanner 10, these additional images of markers may help determine the position and orientation of the mobile 3D measuring system 800.

For the case in which the markers are LEDs, the LEDs may be modulated in time to help remove the effects of background light, the glints of which can erroneously appear to be markers. In addition, modulation can be used to distinguish each of the several LEDs on the mobile 3D measuring system 800. In an embodiment, such modulation provides digital communication signals that are received and decoded by the mobile 3D measuring system 800.

It is also possible to use a plurality of LED colors to help distinguish different LEDs on the mobile 3D measuring system 800. A red-blue-green (RGB) camera might be used, for example, to distinguish the different LEDs.

Figure 16:
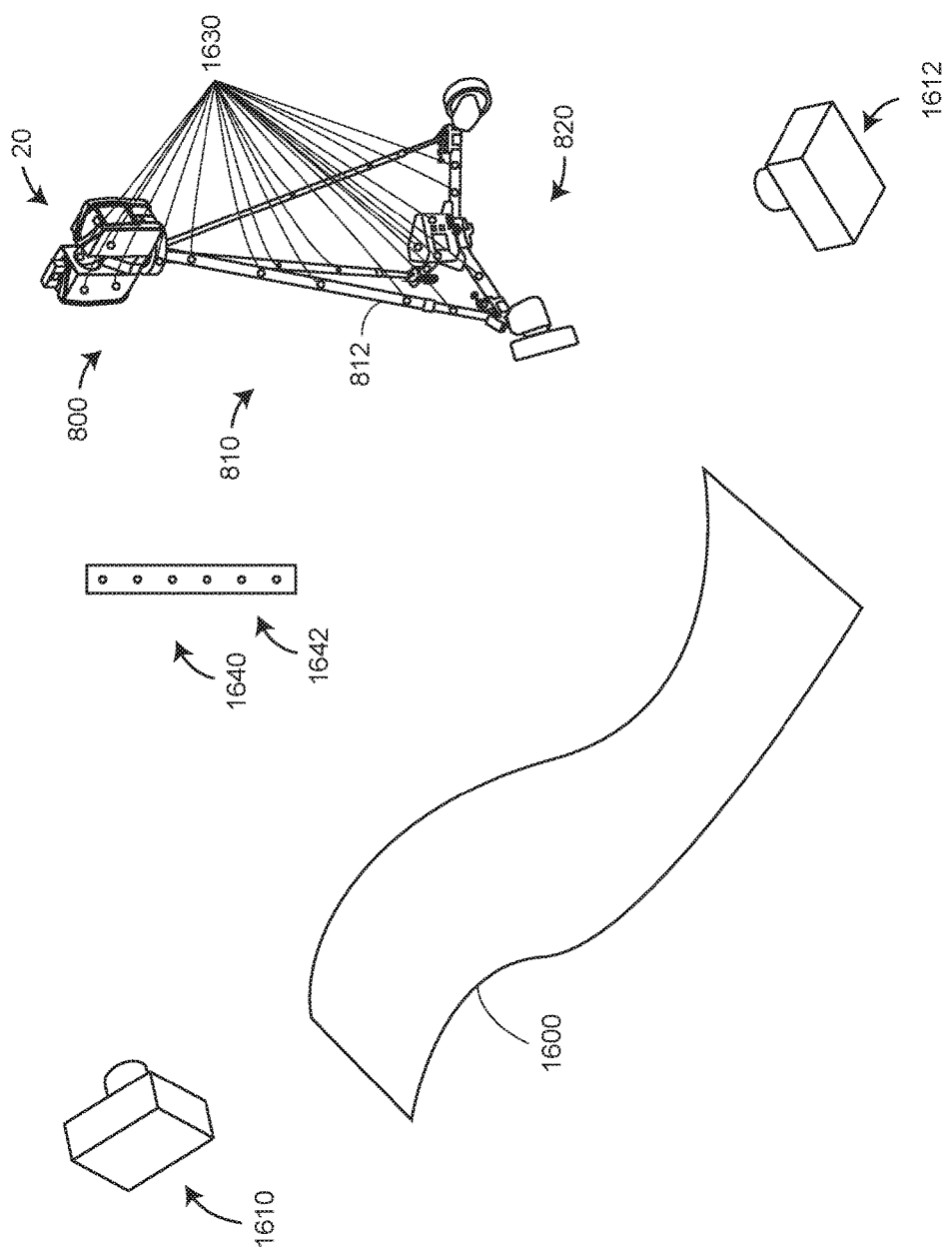
FIG. 16 is a perspective view of a mobile 3D measuring system with external camera sensors according to an embodiment.

For the case in which a single camera is used, for example, a camera 1610 in FIG. 16, the angles to each of LEDs 1630 is determined based on a correspondence between (1) the angle of the LED in relation to the optical axis of the camera to (2) the center of the patch of pixels illuminated by the LED. This correspondence is based on the observation that each ray of light from an LED may be considered to pass through a perspective center of the camera. When a single camera is used to determine distance to an object as well as angles to an object, the relative size of the overall object is also important. An improvement in accuracy is possible through the use of two or more cameras mounted in the environment. For example, a second camera 1612 may assist the camera 1610 in FIG. 16. In this case, a method of triangulation that takes account of the relatively large image-sensor baseline distance or separation between the two cameras may be used to more accurately determine the position and orientation of the mobile 3D measuring system 800. In an embodiment, the plurality of cameras further measures a reference distance to help establish the scale of the camera. For example, LEDs 1642 may be mounted on a reference structure 1640 such as a frame or a scale bar to provide the basis for the scaling adjustment. In an embodiment, the reference structure is made of a material having a low coefficient of thermal expansion (CTE), which helps ensure that it maintains a constant length between markers as temperature is varied. Such a low-CTE material might be a carbon-fiber composite, for example. However, in many cases, a material having a higher CTE, such as steel (having a CTE of around 11.5 micrometer/meter/° C.) may provide enough accuracy.

In an embodiment, the positions of each camera 1610, 1612 is known in an environment. Such camera positions may be found initially by measuring the positions of the cameras with a device such as a laser tracker or by measuring multiple targets at known positions in the environment with both cameras and then solving using an optimization method. An example is a least-squares optimization method in which the sum of squares of residual errors is minimized. The positions of the cameras in the environment may be checked or corrected over time by measuring one or more known lengths such as the lengths between targets 1642 on a scale bar 1640. In an embodiment, LEDs 1630 are located on the body of 3D scanner 20, on the tripod legs 812 and on the mobile dolly 820. In other embodiments, the LEDs are located on just the 3D scanner 20 or on another part of the mobile 3D measuring system 800. In an embodiment, the collected images are processed by a processor to determine the position and orientation of the mobile 3D measuring system 800. In an embodiment, cameras 1610, 1612 send image data to processors of the mobile 3D measuring system 800 for processing. In other embodiments, the camera system that includes the cameras 1610, 1612 has its own processing system used to determine the position and orientation of the mobile 3D measuring system 800. In another embodiment, a network computer performs the calculations. In some embodiments, only a single camera 1610 or a single LED is used, with the resulting calculation yielding only a position of the mobile 3D measuring system 800 rather than a position and an orientation of the mobile 3D measuring system 800.

With the method in which one or two cameras are used to measure at least three sensors, the position and orientation of the mobile 3D measuring system 800 can be found in the frame of reference of the environment. This information can be combined with 3D coordinates measured by the 3D scanner 20 to determine 3D coordinates of the measured point in the frame of reference of the environment.

Besides cameras, there are also devices that measure angles based on the use of coded masks with a plurality of single pixels. Angular accuracies with such angle-measuring devices can be good, for example, on the order of a few arcseconds in some cases. An example of such a system is described in WIPO Patent Application No. 2013/103725 to Dowski Jr., et al., the contents of which are herein incorporated by reference. Such devices may be used to replace the cameras in the discussion herein above.

In an embodiment, an instrument that measures two angles and a distance is used to determine the position and orientation of the mobile 3D measuring system 800. Examples of such devices include laser trackers, laser radars, total stations, and 3D TOF scanners. Such a device may be mounted in an elevated position, for example, on a platform, to obtain greater ability to measure a mobile 3D measuring system 800 over a range of locations in the environment. Alternatively, such a device may be mounted on a platform, tripod, or instrument stand that is approximately at the same height as the mobile 3D measuring system 800.

Figure 17:
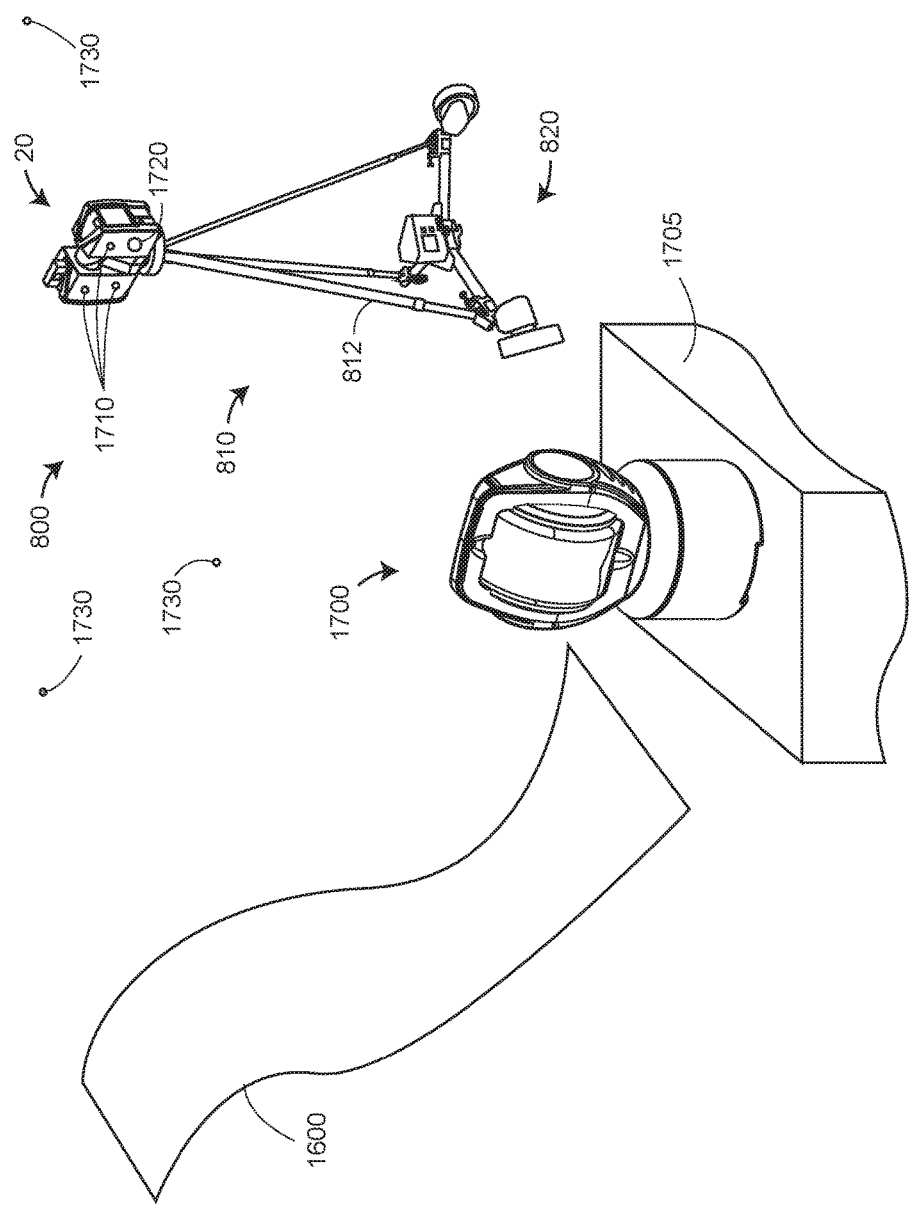
FIG. 17 is a perspective view of a mobile 3D measuring system with external laser tracker sensor according to an embodiment.

FIG. 17 illustrates a laser tracker 1700 mounted on an elevated platform 1705 that in an embodiment measures three or more retroreflectors 1710, such as cube-corner retroreflectors mounted on the body of the 3D scanner 20. By measuring the three retroreflectors 1710, the tracker may determine the position and orientation of the 3D scanner 20. The position and orientation of the tracker is known in the environment based on measurements carried out ahead of time. In these measurements, the laser tracker is used to measure features within the environment to establish its own position and orientation within the environment. Measurements may be periodically performed by the tracker to ensure that the tracker position and orientation remains correct. Such measurements may include, for example, measuring retroreflectors 1730 mounted in the environment. With the position and orientation of the mobile 3D measuring system 800 known, the 3D scanner 20 may proceed to measure the characteristics of the object 1600. A laser tracker may have a range of up to 80 meters and hence may be able to assist is directing several distinct mobile 3D measuring systems 800.

In other embodiments, other instruments capable of measuring retroreflector targets replace the laser tracker 1700. In one embodiment, the laser tracker 1700 is replaced with a total station having the capability of measuring a retroreflector target. In another example, the laser tracker is replaced with focusing laser scanner (sometimes referred to as a laser radar) having the capability of measuring two angles and a distance to a tooling ball, which is a highly reflective ball of steel. In an embodiment, laser light from the laser radar is focused to a relatively small spot on the tooling ball. The beam is steered around and the angle at which maximum light is returned to the laser radar is the angle at which the beam of light points to the center of the sphere. Hence the tooling balls in this instance act as retroreflectors 1710 and 1730 in FIG. 17. In an alternative embodiment, a tracker-scanner device combines the capability of a laser tracker to measure cooperative targets, such as SMRs, with the ability to measure diffuse surfaces. In other words, this type of device combines tracker and scanner capabilities.

In another embodiment also illustrated in FIG. 17, a laser tracker is of the type capable of measuring six degrees of freedom (six-DOF) and the retroreflector 1720 is a six-DOF target. A six-DOF laser tracker is a laser tracker having the ability to measure three orientation angles (such as pitch, roll, and yaw) as well as three positional coordinates (such as x, y, and z) when using a six-DOF probe. Such six-DOF lasers and six-DOF targets use a variety of techniques to measure the six degrees of freedom. In this embodiment represented by FIG. 17, the six-DOF laser tracker 1700 measures the six-DOF target to determine the position and orientation of the 3D scanner 20.

For embodiments in which a laser tracker or total station is used to measure 3D coordinates of three SMRs on the system 800 or in which a focused laser scanner is used to measure 3D coordinates of three tooling balls on the system 800, the information collected from these measurements can be combined with the 3D coordinates measured by the 3D scanner 20 to determine 3D coordinates of the measured point in the frame of reference of the environment.

For embodiments in which a six-DOF laser tracker is used to measure 3D coordinates of a six-DOF target on the system 800, this measurement can be combined with the 3D coordinates measured by the 3D scanner 20 to determine 3D coordinates of the measured point in the frame of reference of the environment.

In another embodiment, four distance meters are mounted in the environment. In an initial step, the four (or more) interferometers or absolute distance meters (ADMs) measure each a retroreflector at each of ten positions. The collected information is enough to determine the 3D position and offset value (distance zero value) of each of the four distance meter. After this procedure has been performed once, the 3D coordinates of a retroreflector may be determined by a single measurement, referred to as a multilateration measurement. By performing such a measurement on three retroreflectors 1710, the position and orientation of the mobile 3D measuring system 800 may be determined by a processor.

In one mode of operation, the mobile 3D measuring system 800 operates under instructions provided on the computer network. Alternatively, a user may take remote control of the mobile 3D measuring system 800. In some cases, a user may want to a visual indication of the factory. In this case, the scanner may travel through the aisle ways returning real-time color images to the user. The user may ask the scanner to slow down or take a different path to provide more detailed images. The user may then ask for supplemental information on the position of assembly areas or the amount of new or in-process inventory in the plant. In some instances, the scanner may be able to count inventory directly based on 2D or 3D measurements or based on information collected from labels such as a bar-code, an RFID tag or a QR codes. In an embodiment, the mobile 3D measuring system 800 is equipped with an RFID reader and a barcode reader or QR coder reader.

In an embodiment, the scanner software continually checks for potential obstacles and overrides user commands when needed to ensure safety. In an embodiment, a mobile 3D measuring system 800 may raise an alert when a problem is observed, particularly if the mobile 3D measuring system 800 observes a potential safety issue.

In an embodiment, the operator concurrently controls several distinct mobile 3D measuring systems 800. While some systems 800 collects information according to instructions provided by the computer network or according to earlier instructions of the user, one or more systems 800 operate under interactive control of the user. An operator who remotely controls one or more mobile 3D measuring systems 800 may be near the systems 800 or in a different location far away from the systems 800. An operator may remotely control mobile 3D measuring systems 800 residing in several different locations.

In most cases, each mobile 3D measuring system concurrently controlled by an operator include a 3D measuring device mounted on a motorized stand, with each 3D measuring device configured to project light onto one or more points in an environment. In an embodiment, each 3D measuring device determines 3D coordinates of the illuminated point by measuring a distance, a first angle, and a second angle to the point. Examples of 3D measuring devices that may be concurrently controlled include a 3D time-of-flight (TOF) scanner, a triangulation scanner, a laser tracker, and a combination tracker/scanner. A triangulation scanner includes a projector and a camera, the projector configured to project a pattern of light onto an object, the camera separated from the projector by a baseline distance, the camera further configured to measure the projected pattern on the object. For the triangulation scanner and the 3D TOF scanner, the illuminated point is usually on the object being measured, which is ordinarily a diffusely scattering object. For the case of a laser tracker, the illuminated point is usually at the vertex of a retroreflector, for example, at the center of a spherically mounted retroreflector (SMR) that houses a cube-corner retroreflector. A combination tracker/scanner has the ability to measure a point on a diffusely scattering surface (for example, a surface of an automobile body-in-white) and to measure a position of a retroreflector target.

In some cases, a computer network or an operator may provide general instructions, for example, to check whether a layout conforms to plans or whether inventory is as expected. In some embodiments, the details of how these instructions are to be carried out may be left to the mobile 3D measuring system 800 or to other processors in the system. For example, guidance may be provided at least partially by external sensors such as cameras or laser trackers, as explained herein above. In other cases, the operator may lead the mobile 3D measuring system 800 on a path that is to be followed in a particular case or on a routine basis. The scanner follows the operator, monitoring the movement with readings of its internal sensors (e.g., wheel odometer, 2D scanner, 2D camera, 3D camera, ultrasound, IMU). Following the operator in this way provides the mobile 3D measuring system 800 with enough information to complete a detailed survey along the indicated path when time permits.

In an embodiment, the user interface may be a touchscreen display from which the operator may give instructions to any of the plurality of mobile 3D measuring systems and may receive information, such as 3D coordinate information, from the mobile 3D measuring systems. In an embodiment, the user interface may include a plurality of computer monitors, for example, to show information being gathered from each of the mobile 3D measuring systems. In an embodiment, the operator may communicate with the mobile 3D measuring systems through a virtual reality (VR) wearable device such as a VR wearable headset that provides the user with an immersive 3D experience. An advantage of such a device is in providing a greater level of 3D realism (immersion) and control to the operator. The user interface may be configured to provide augmented reality (AR) by superimposing constructed elements over real time 2D or 3D images provided by the user interface. Such constructed images could be obtained from CAD files, or they might be visual objects extracted from a catalog of 3D images. Such AR images can be useful for visualizing proposed changes to an environment. AR or VR displays can be provided through enhanced eyeglasses, headsets, or 2D display monitors.

In an embodiment, an operator may elect to view 3D information collected by one or more of the mobile 3D measuring systems, according to a selection made by the operator. The operator may choose to compare characteristics of an object measured by a mobile 3D measuring system with information on the object stored in memory, for example, on a computer network. For example, a computer network may include a CAD file including dimensional characteristics of an object being measured by one of the mobile 3D measuring systems. These stored dimensional characteristics may be compared to the measured dimensional characteristics to determine whether the characteristics are as expected—for example, whether the dimensions in a CAD file are consistent with dimensions measured by the mobile 3D measuring system. In an embodiment, characteristics of an object as stored in memory, for example, on a computer network, may be compared to characteristics of an object as measured by a mobile 3D measuring system. By such a comparison, the system may identify for the operator objects viewed by a mobile 3D measuring system. Information associated with the identified object may be extracted from the computer network and provided to the operator through the user interface. For example, the mobile 3D measuring system may identify an object as a tool configured to produce a particular subassembly in a manufacturing plant. The computer network may then pull from memory information associated with the performance of this tool—for example, production rate and defect rate. Such information may be presented to the operator through the user interface. As another example, the mobile 3D measuring system may identify a storage depot for supplying components used in manufacturing. The mobile 3D measuring system may identify the number of components currently in inventory. It may make this determination based on 2D images or by 3D measurements. It may compare this inventory level to the inventory requirements to determine or confirm that the storage depot needs to be restocked. The mobile 3D measuring system may confirm that it has correctly identified the items in inventory by reading a tag associated with the storage deport—for example, an RFID tag, a bar code tag, or a QR code tag. The mobile 3D measuring system may also measure the size of elements in an environment, for example, to see if room is available to place a new piece of equipment. In an embodiment, an operator may direct a mobile 3D measuring device along a desired path, using a 2D view or a 3D view to see directly what is happening at a given time. The operator may use a joystick or similar control to move the 3D measuring system in a desired path. Alternatively, the operator may refer to a map or the environment to direct the mobile 3D measuring system to the desired location, or the operator may rely on a computer network to direct the mobile 3D measuring system to a desired location. As another example, the operator may direct the mobile 3D measuring system to check the unobstructed width of aisle ways to ensure that adequate room is available to carry out required functions such as restocking storage deports or moving new equipment into position.

As mentioned herein above, an application for which the motorized dolly 820 with 3D measuring device may be advantageously used is the accurate measuring of objects over large areas and from all directions. A difficulty faced to some degree by all 3D measuring instruments is the need to register multiple scans when the object to be measured extends over a large area or a large angular region. An example of such a measurement challenge is measuring of an object such as an automobile from all sides; in other words, over 360 degrees. In the case of a device such as a laser tracker, registration is usually accomplished by placing magnetic nests in a region surrounding the object under test. For example, magnetic nests may be attached to a floor surrounding the object under test. After a laser tracker has measured one side of the automobile, it measures spherically mounted retroreflectors (SMRs) placed in the magnetic nests. It then moves around the object and again measures the SMRs. The tracker measures the 3D coordinates of the SMRs at the first position, before the tracker is moved, and at the second position, after the tracker is moved. As long as at least three SMR positions are measured in common from each position, the measurements taken by the laser tracker at the first position and the second position can be put into a common frame of reference.

Methods are now described for use of the motorized dolly 820 or equivalent motorized moving device to provide a variety of 3D measuring devices with registration over 360 degrees without user intervention.

Figure 18:
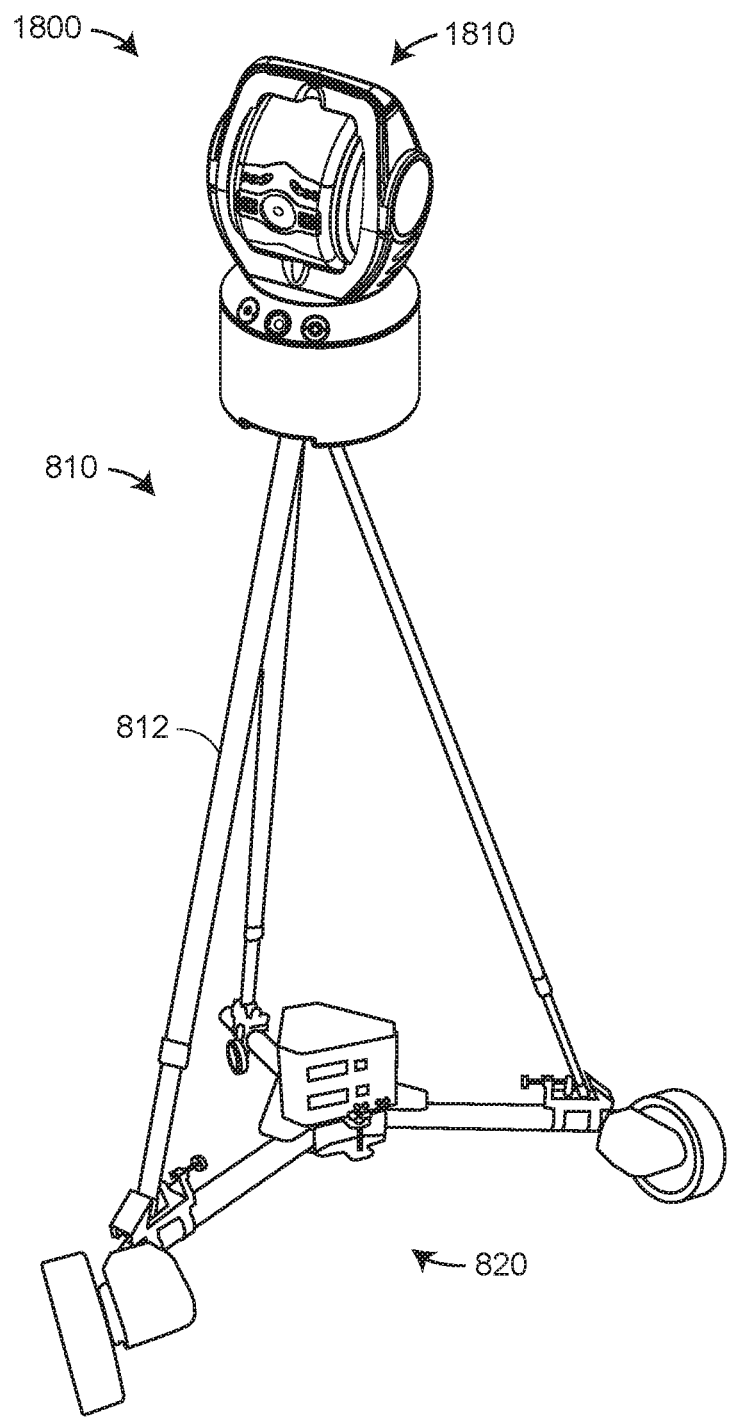
FIG. 18 is a perspective view of a mobile 3D measuring system according to an embodiment.

FIG. 18 shows an embodiment of a mobile 3D measuring device 1800 that includes a 3D measuring device 1810 mounted on a motorized tripod assembly 810. The 3D measuring device 1810 may be a tracker, six-DOF tracker, total station, tracker-scanner device or laser radar. The tripod assembly 810 may include a tripod 812 and a motorized dolly 820.

Figure 19:
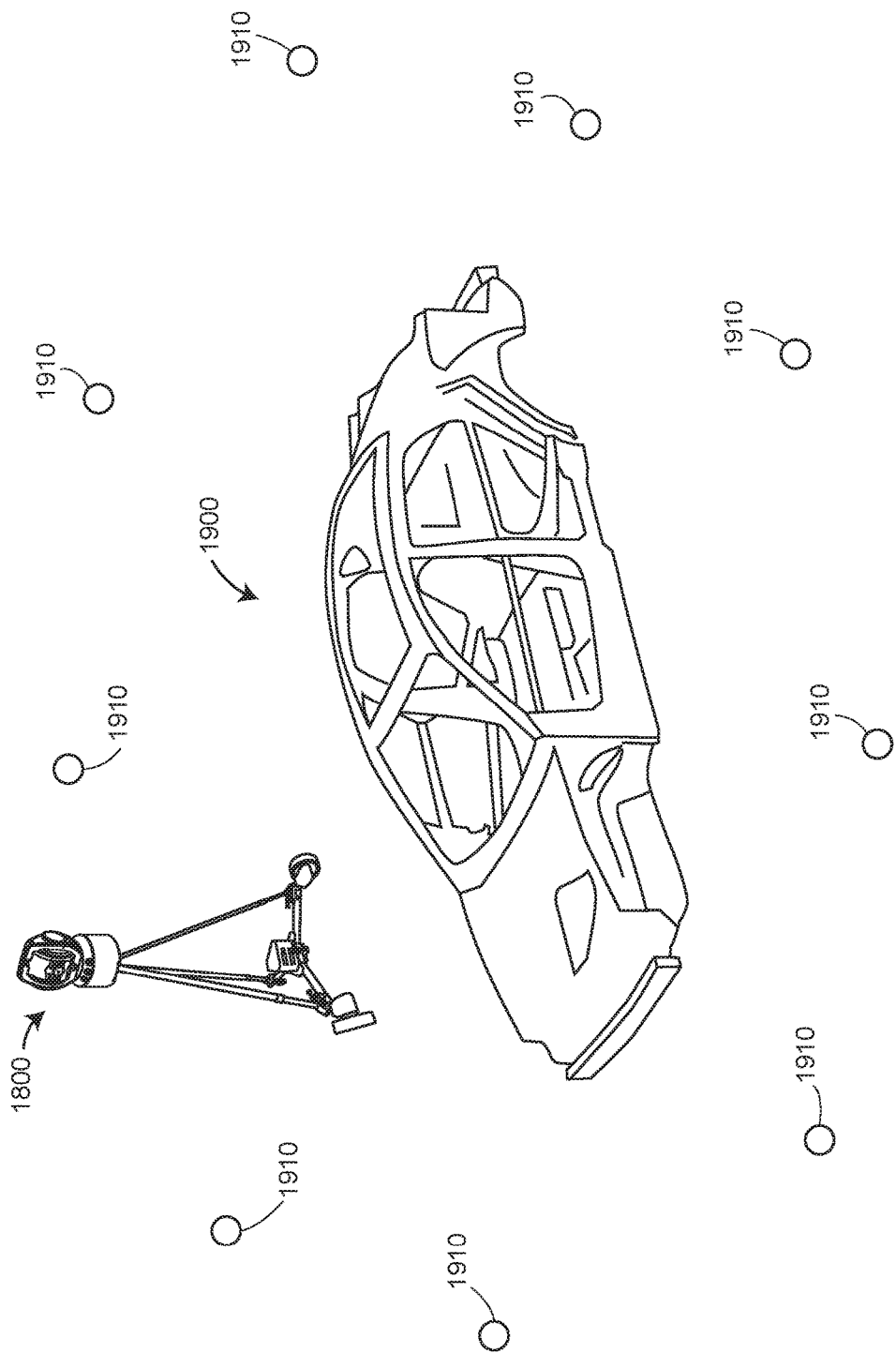
FIG. 19 is a perspective view of a mobile 3D measuring system used to measure an object according to an embodiment.

FIG. 19 shows a mobile 3D measuring device 1800 together with an automobile body-in-white (BiW) 1900 surrounded by cooperative targets 1910, which may be tooling balls, cateye retroreflectors or SMRs. In an embodiment, the 3D measuring device 1810 has the ability to measure a cooperative target such as an SMR and a diffuse surface such as a surface of the BiW 1900. When measurements of the BiW diffuse surfaces are completed, the 3D measuring device 1810 may then measure accessible cooperative targets 1910. The motorized dolly 820 is activated to drive the mobile 3D measuring device 1800 to a second location. At the second location, the 3D measuring device again measures the accessible cooperative targets 1910, which should include at least three cooperative targets 1910 in common with those measured at the first position of the mobile 3D measuring device. The 3D coordinates of the cooperative targets 1910 at the first and second location are used to determine a common frame of reference for the 3D scanner measurements made at the two positions. Measurements are made at as many locations as necessary to determine the 3D coordinates for the body-in-white surface, all put in a common frame of reference. An advantage of this method over prior art methods is that the measurement is made around a full 360 degrees using a single mobile measuring device without operator intervention.

Figure 20:
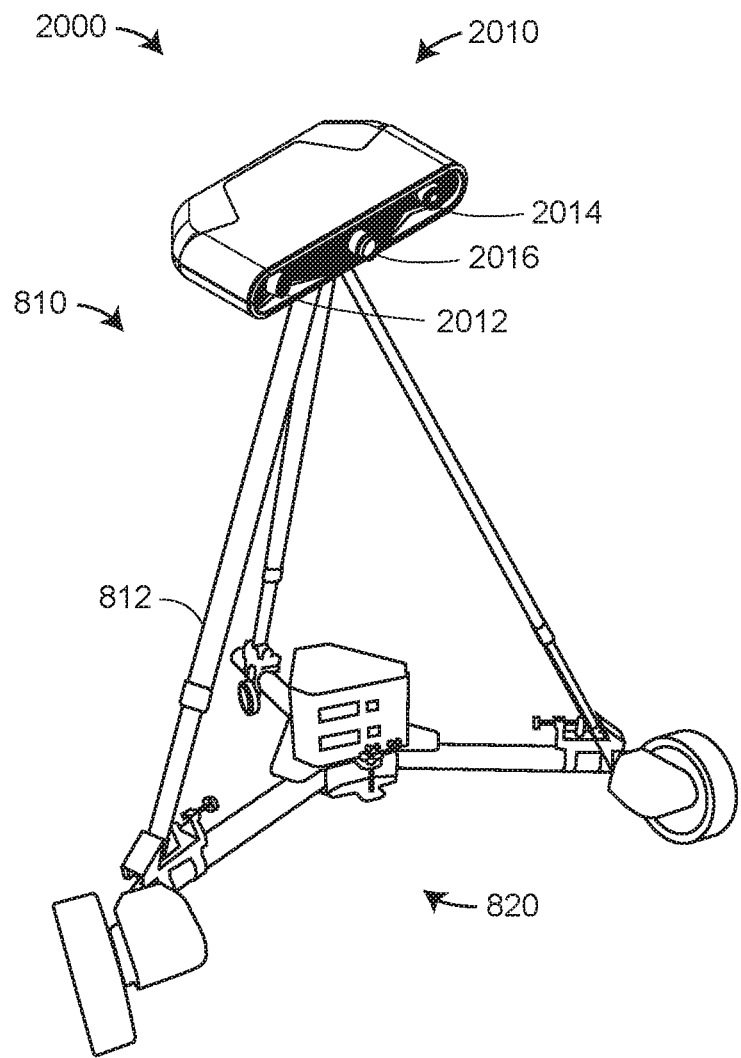
FIG. 20 is a perspective view of a mobile 3D measuring system according to an embodiment.

FIG. 20 shows an embodiment of a mobile 3D measuring system 2000 that includes a triangulation scanner 2010 mounted on a motorized tripod assembly 810. In an embodiment, a triangulation scanner 2010 is a device that includes a projector 2016 and one or more cameras 2012, 2014. In a first mode of operation of the triangulation scanner, the projector 2016 projects a single pattern of light onto an object and the one or more cameras 2012, 2014 capture an image of the light reflected from the object. In this mode of operation, the projected pattern includes elements having a distinctive appearance that may be identified by the camera. Based on this correspondence and on a baseline distance between the projector 2016 and camera 2012 or 2014, the 3D coordinates of the surface of the illuminated object may be determined. Alternatively, for a system having two cameras 2012, 2014, the 3D coordinates may be determined based on the correspondence between distinctive elements on the first and second cameras and on the baseline distance between the two cameras. The first mode of operation is suitable for a handheld scanner since the scanner does not need to be held steady while multiple images are captured.

In a second mode of operation of the triangulation scanner 2010, the projector 2016 sequentially projects multiple patterns of light onto an object, which are captured by one or more cameras 2012, 2014. In an embodiment, the projected pattern of light has a sinusoidal variation in phase over space that produces a stripe-like appearance. The phase of the projected pattern is varied in successive projections, and the intensities of light observed at each pixel of the cameras 2012, 2014 is used in a triangulation calculation to determine 3D coordinates of the object surface. This sequential mode of triangulation is usually more accurate than the single-shot mode. Because the mobile 3D measuring system 2000 can be kept stationary during the measurement of multiple phases, it is suitable for use with the relatively more accurate sequential measurement method.

In a third mode of operation of a triangulation scanner, the scanner is configured to arrange two cameras and a projector in a triangle. In this case, a pattern of spots having no distinguishable pattern may be projected onto an object and a correspondence determined among spots projected on the object and spots imaged by the two cameras. This embodiment of a triangulation camera having the two cameras and one projector arranged in a triangle is not shown in the figures.

Figure 21:
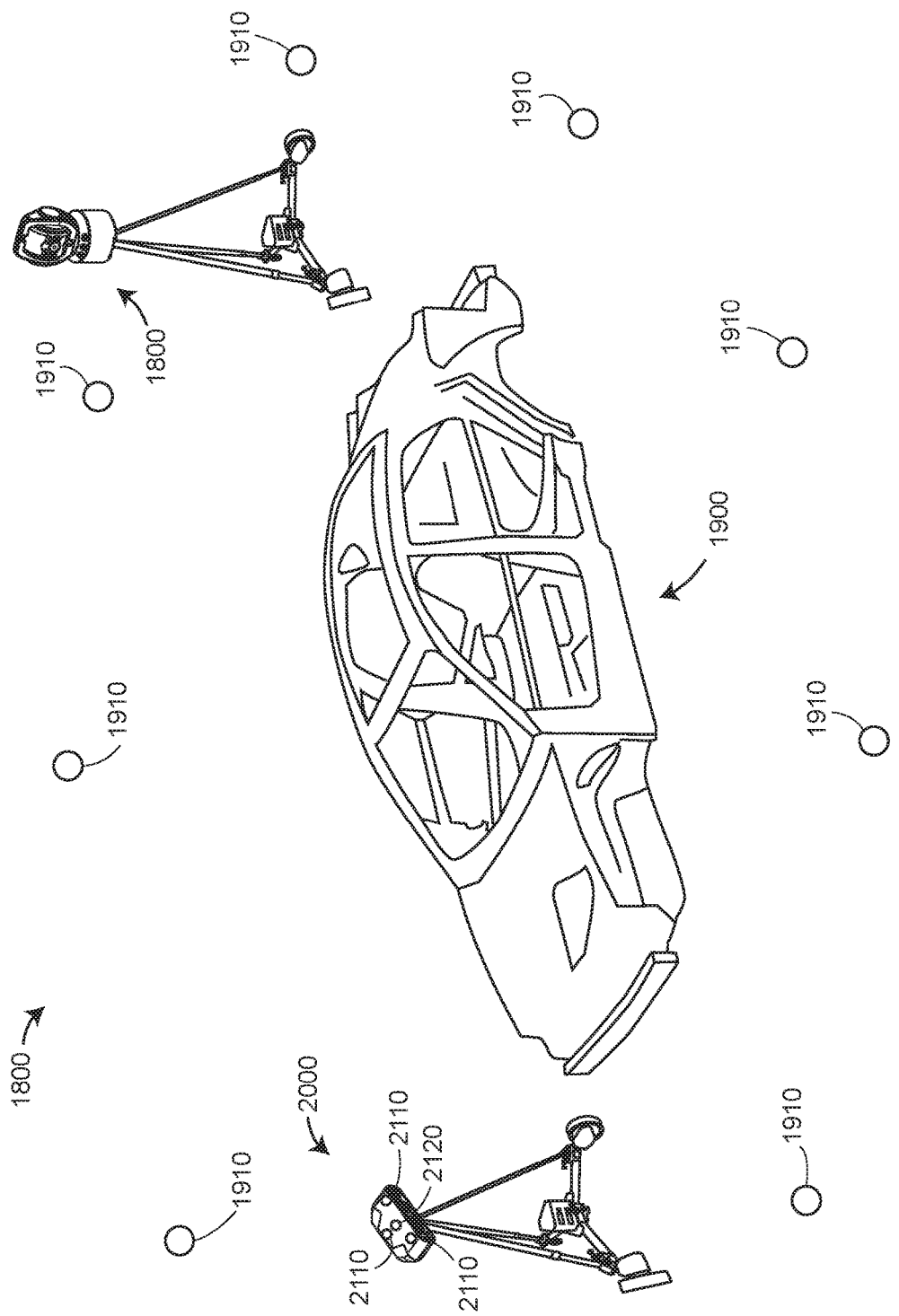
FIG. 21 is a perspective view of a first mobile 3D measuring system used to measure an object and a second mobile 3D measuring system used to assist in registration of the first mobile 3D measuring system according to an embodiment.

FIG. 21 shows a mobile 3D measuring system 2100 together with an automobile body-in-white 1900 surrounded by cooperative targets 1910. In an embodiment, the 3D measuring device 1800 measures cooperative targets 2110 or 2120 mounted on a triangulation scanner 2010. The 3D measuring device 1800 has the ability to measure cooperative targets 2110 or 2120 and may also have the ability to measure diffusely scattering surfaces of an object 1900. At least three cooperative targets 2110 (regular SMRs or tooling balls) or one six-DOF target assembly 2120 needs to be measured to determine the position and orientation of the triangulation scanner 2010 within the frame of reference of the laser tracker 1700 or other 3D measuring device. In an embodiment, the mobile 3D measuring system 2100 moves as needed to measure the surface of the object 1900. It time it moves, the laser tracker 1700 or 3D measuring device 1810 measures the targets 2110 or 2120 to determine the position and orientation of the scanner 2010 in the frame of reference of the tracker 1700 or combination 3D measuring device 1810. If the cooperative targets on the mobile 3D measuring system 2100 move out of view of the laser tracker, the tracker moves to a new position and re-establishes the new position in the frame of reference common with the first position. It does this by measuring with the device 1800 three or more common retroreflector targets 1910 from two or more different locations.

Figure 22:
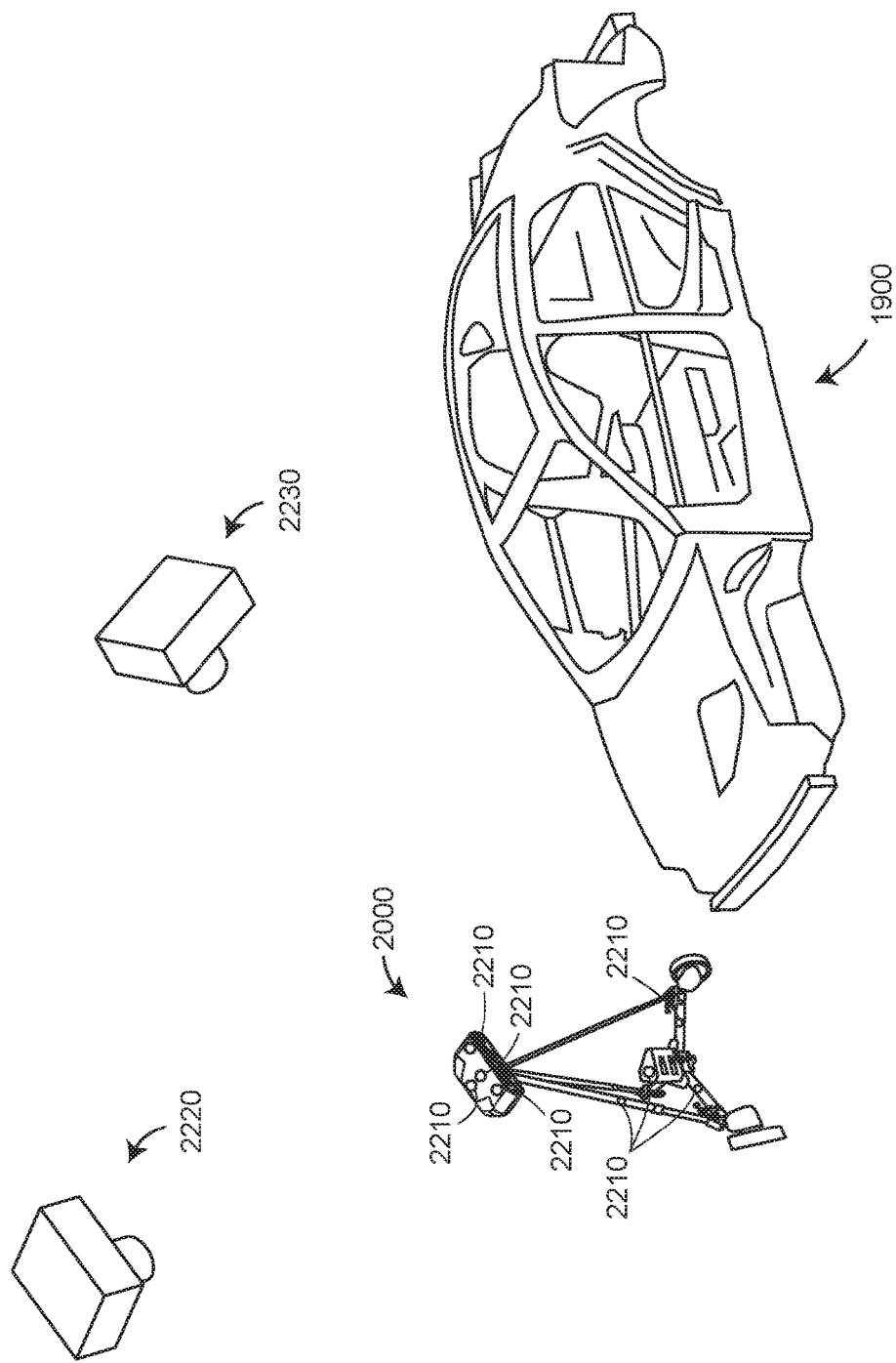
FIG. 22 is a perspective view of a mobile 3D measuring system used to measure an object while external camera sensors assist in registration according to an embodiment.

FIG. 22 shows the mobile 3D measuring system 2000 together with an automobile body-in-white 1900. In an embodiment, targets 2210 such as LEDs mounted on the mobile 3D measuring system 2000 are measured by two or more cameras 2220, 2230 to determine the position and orientation of the mobile 3D measuring system 2000 in a common frame of reference.

Methods are now described for use of the mobile 3D measuring system 800 in building construction, particularly for monitoring and evaluating construction and for providing assistance in installing finish elements such as trim, cabinets, appliances, countertops, and floor coverings.

In an embodiment, a mobile 3D measuring system 800 inspects rooms on a floor in an unfinished building. If the building includes more than one floor or a step-down or step-up transition, the system 800 may need to be carried to the area to be inspected. The mobile 3D measuring system 800 identifies doors, windows, and floors that need to be trimmed, floors that need to be covered, and doors that need to be installed.

Today, the usual method of trimming doors, windows, and floors with moldings, casings, and the like is for a construction worker to measure each dimension and hand cut each trim piece. This method is time consuming and the fit of the trim piece is sometimes not very good. In an embodiment, the system 800 uses the motorized dolly 820 to move throughout a building measuring the size and shape of each door, window, ceiling, and floor and provides the requirements for the length and angle of cut of each trim element to a construction manager, who places an order with a third party fabrication company. The fabrication company provides all the trim components labeled to indicate the location at which they are to be installed in the house. The labels might be NFC tags, bar-codes, QR codes, or written descriptions. The identifier label may be placed on back side of the trim elements to prevent them from being seen following installation. By providing all of the trim elements cut and marked, the trim can be installed in a fraction of the time that would otherwise be required.

In another embodiment, the size and shape of an uncovered floor is measured and provided to a contractor who cuts the building materials to the required size and shape. This can save considerable time. For example, ceramic tiles can be time consuming to cut on site but efficiently cut in an automated manufacturing process.

Today, contractors create templates and perform other measurements to determine the required sizes and shapes of countertops and cabinets that match room dimensions, appliances, and plumbing. Typical measuring methods, for example, using templates, are relatively time consuming and prone to error. In an embodiment, a mobile 3D measuring system 800 determines required countertop and cabinet dimensions based at least in part on room dimensions measured by the mobile 3D measuring system 800.

In an embodiment, if the distance measurements performed by the 3D scanner 20 are based on an invisible infrared wavelength of light, then the 3D scanner 20 also includes a visible beam of light, which might for example be red light. To position elements such as a kitchen island, the mobile 3D measuring system 800 emits a visible beam of light that traces the pattern corresponding to the correct shape and position of the island. If new plumbing is needed for a bathtub in a bathroom, the mobile 3D measuring system 800 again emits a beam of red light marking out the required location of the plumbing.

The mobile 3D measuring system 800 may measure the position and orientation of cabinets during installation to indicate whether each is plumb and to suggest any needed changes, for example, through the use of shims. A visible beam of light may also be used to mark a plumb line along a wall to assist in aligning cabinets or appliances before screwing them in place.

In an embodiment, the desired location in a room for an element such as a countertop or cabinet is found using an electronic file provided by a designer. Such electronic design files are expected to become much more common in the future. By measuring the dimensions of a room with the mobile 3D measuring system 800, the required positions and orientations of each element in the room can be determined and indicated by the visible beam of light from the 3D scanner 20. In an embodiment, the location of this visible beam of light is based at least partly on 3D measurements of the room by the mobile 3D measuring system 800.

In some cases, the scanner may, in its usual mode, spin rapidly while measuring distances at high speed. For example, the beam may measure more than one million points per second as it spins around a horizontal axis. Other modes of operation besides this high speed mode are possible. In another mode of operation, it may slow the sample rate while simultaneously reducing the optical power. For example, the sample rate may be slowed to 1000 points per second. The reduced sample rate enables the optical power to be reduced while maintaining relatively high accuracy (by averaging out random noise). In this case, the beam, which may include both red and infrared light, may be directed in any location and held in that location without a potential eye safety danger. In still another mode of operation, 3D coordinates of a surface are first measured at high speed with infrared (invisible) light. Marks may be then laid down in visible light over a pattern of interest based on angles of projection.

Terms such as processor, controller, computer, DSP, FPGA are understood in this document to mean a computing device that may be located within an instrument, distributed in multiple elements throughout an instrument, or placed external to an instrument.

In accordance with an embodiment, a method is provided that includes providing a mobile three-dimensional (3D) measuring system including a 3D time-of-flight (TOF) scanner coupled to a first motorized stand and to a plurality of targets, the first motorized stand including a plurality of motorized wheels configured to propel and turn the first motorized stand under computer control. A first image sensor is provided in an environment. A computer system is provided in communication with the mobile 3D measuring system and the first image sensor. The first image sensor obtains a first image of the plurality of targets. The computer system determines a first position of the mobile 3D measuring system within an environment frame of reference, the first position based at least in part on the first image. The first position is provided to the mobile 3D measuring system. The mobile 3D measuring system determines a position of the mobile 3D measuring system within the environment frame of reference based at least in part on the provided first position. A beam of scanner light is projected from the 3D TOF scanner onto an object. The 3D TOF scanner, in response to the projected beam of scanner light, measures first 3D coordinates of a first point on the object. 3D coordinates of the first point are determined in the environment frame of reference based at least in part on the first 3D coordinates of the first point and on the first position of the mobile 3D measuring system in the environment frame of reference. The first 3D coordinates of the first point in the environment frame of reference are stored.

In accordance with an embodiment, the first image sensor is a first two-dimensional (2D) camera. In accordance with another embodiment, the first image sensor is a depth camera that measures 3D coordinates. In accordance with another embodiment, the method further comprising providing a second image sensor, the second image sensor being a second 2D camera, there being a baseline distance between the first 2D camera and the second 2D camera.

In accordance with another embodiment, the method further comprises obtaining with the second image sensor a second image of the plurality of targets; and determining by the computer system the first position of the mobile 3D measuring system within the environment frame of reference further based on the second image. In accordance with another embodiment, the method further comprises providing a reference structure within a field of view of the first image sensor, the reference structure having reference length value, the reference length value being a calibrated length from a first reference target to a second reference target on the reference structure.

In accordance with another embodiment, the method further comprises obtaining with the first image sensor a third image of the first reference target and the second reference target; and determining with the computer system the first position of the mobile 3D measuring system within the environment further based on the third image and the reference length value.

In accordance with another embodiment, the at least one of the plurality of targets is selected from the group consisting of: a light-emitting diode (LED), a reflective spot, and a retroreflector. In accordance with another embodiment, the at least one of the plurality of targets is a light-emitting diode (LED) that is modulated in time.

In accordance with still another embodiment, method is provided that includes providing a mobile three-dimensional (3D) measuring system including a 3D time-of-flight (TOF) scanner coupled to a first retroreflector, a second retroreflector, a third retroreflector, and a first motorized stand, the first motorized stand including a plurality of motorized wheels configured to propel and turn the first motorized stand under computer control. A 3D measuring device is provided in a first device frame of reference, the 3D measuring device configured to steer a device beam of light onto a retroreflector target, to measure a distance, a first angle, and a second angle from the 3D measuring device to the retroreflector target, and to determine 3D coordinates of the retroreflector target based at least on the measured distance, the measured first angle, and the measured second angle. The first motorized stand is activated to move the mobile 3D measuring system to a first position. A beam of scanner light is projected from the 3D TOF scanner onto an object. The 3D TOF scanner measures, in response to the projected beam of scanner light, first 3D coordinates of a first point on the object. The 3D measuring device measures first 3D coordinates of the first retroreflector, first 3D coordinates of the second retroreflector, and first 3D coordinates of the third retroreflector. Registered 3D coordinates of the first point are determined in the first device frame of reference based at least in part on the measured first 3D coordinates of the first point on the object, the measured first 3D coordinates of the first retroreflector, the measured first 3D coordinates of the second retroreflector, and the measured first 3D coordinates of the third retroreflector. The registered 3D coordinates of the first point are stored. In accordance with another embodiment, the 3D measuring device is selected from the group consisting of: a laser tracker, a total station, and a laser radar.

In accordance with still another embodiment, a method is provided that includes providing a mobile three-dimensional (3D) measuring system including a 3D scanner coupled to a first retroreflector, a second retroreflector, a third retroreflector, and a first motorized stand, the first motorized stand including a plurality of motorized wheels configured to propel and turn the first motorized stand under computer control, the 3D scanner including a projector and a camera, the projector configured to project a pattern of light, the camera separated from the projector by a baseline distance. A 3D measuring device is provided in a first device frame of reference, the 3D measuring device configured to steer a beam of light onto a retroreflector target, to measure a distance, a first angle, and a second angle from the 3D measuring device to the retroreflector target, and to determine 3D coordinates of the retroreflector target based at least on the measured distance, the measured first angle, and the measured second angle. The first motorized stand is activated to move the mobile 3D measuring system to a first position. The projector projects a first pattern of light onto an object. The camera captures a first image of the first pattern of light on the object. First measured 3D coordinates of a first point on the object are determined based at least in part on the projected first pattern of light, the captured first image, and the baseline distance. The 3D measuring device determines in the first device frame of reference first 3D coordinates of the first retroreflector, first 3D coordinates of the second retroreflector, and first 3D coordinates of the third retroreflector. Registered 3D coordinates of the first point are determined in the first device frame of reference based at least in part on the first measured 3D coordinates of the first point, the first 3D coordinates of the first retroreflector, the first 3D coordinates of the second retroreflector, and the first 3D coordinates of the third retroreflector. The registered 3D coordinates of the first point are stored.

In accordance with another embodiment, the method further comprises activating the first motorized stand to move the mobile 3D measuring system to a second position. The projector projects a second pattern of light onto the object. The camera captures a second image of the second pattern of light on the object. A second measured 3D coordinates of a second point on the object is measured based at least in part on the projected second pattern of light, the captured second image, and the baseline distance. A second 3D coordinates of the first retroreflector, a second 3D coordinates of the second retroreflector, and a second 3D coordinates of the third retroreflector are determined in the first device frame of reference with the 3D measuring device. A registered 3D coordinates of the second point in the first device frame of reference is determined based at least in part on the measured second 3D coordinates of the second point, the measured second 3D coordinates of the first retroreflector, the measured second 3D coordinates of the second retroreflector, and the measured second 3D coordinates of the third retroreflector.

In accordance with another embodiment, the method further comprises moving the 3D measuring device to a second device frame of reference. A third pattern of light is projected with the projector onto the object. A third image of the third pattern of light on the object is captured with the camera. A third measured 3D coordinates of a third point on the object is determined based at least in part on the projected third pattern of light, the captured third image, and the baseline distance. A third 3D coordinates of the first retroreflector, a third 3D coordinates of the second retroreflector, and a third 3D coordinates of the third retroreflector are determined with the 3D measuring device in the second device frame of reference. A registered 3D coordinates of the third point in the first device frame of reference is determined based at least in part on the measured third 3D coordinates of the third point, the measured second 3D coordinates of the first retroreflector, the measured second 3D coordinates of the second retroreflector, the measured second 3D coordinates of the third retroreflector, the measured third 3D coordinates of the first retroreflector, the measured third 3D coordinates of the second retroreflector, and the measured third 3D coordinates of the third retroreflector.

In accordance with another embodiment, the method further comprises providing, in the first device frame of reference, a fourth retroreflector, a fifth retroreflector, and a sixth retroreflector, wherein the fourth retroreflector, the fifth retroreflector, and the sixth retroreflector are not coupled to the 3D scanner. A first 3D coordinates of the fourth retroreflector, a first 3D coordinates of the fifth retroreflector, and a first 3D coordinates of the sixth retroreflector are determined with the 3D measuring device in the first device frame of reference. The 3D measuring device is moved to a second device frame of reference. A second 3D coordinates of the fourth retroreflector, a second 3D coordinates of the fifth retroreflector, and a second 3D coordinates of the sixth retroreflector are determined with the 3D measuring device in the second device frame of reference. A third pattern of light is projected with a projector onto the object. A third image of the third pattern of light on the object is captured with a camera. A third measured 3D coordinates of a third point on the object is determined based at least in part on the projected third pattern of light, the captured third image, and the baseline distance. A registered 3D coordinates of the third point in the first device frame of reference is determined based at least in part on the measured third 3D coordinates of the third point, the measured first 3D coordinates of the fourth retroreflector, the measured first 3D coordinates of the fifth retroreflector, the measured first 3D coordinates of the sixth retroreflector, the measured second 3D coordinates of the fourth retroreflector, the measured second 3D coordinates of the fifth retroreflector, and the measured second 3D coordinates of the sixth retroreflector.

In accordance with another embodiment, the method further comprises providing a second motorized stand, the second motorized stand coupled to the 3D measuring device, the second motorized stand including a second plurality of motorized wheels configured to propel the second motorized stand under computer control. In accordance with an embodiment, the 3D measuring device is selected from the group consisting of: a laser tracker, a total station, and a laser radar.

In accordance with still another embodiment, a method is provided that includes providing a mobile three-dimensional (3D) measuring system including a 3D scanner coupled to a first six degree-of-freedom (six-DOF) retroreflector target and a first motorized stand, the first motorized stand including a plurality of motorized wheels configured to propel and turn the first motorized stand under computer control, the 3D scanner including a projector and a camera, the projector configured to project a pattern of light, the camera separated from the projector by a baseline distance. A six-DOF laser tracker is provided configured to determine six degrees of freedom of a six-DOF retroreflector target. The first motorized stand is activated to move the mobile 3D measuring system to a first position. A first pattern of light is provided with a projector onto an object. A first image of the first pattern of light on the object is captured with a camera. A first measured 3D coordinates of a first point on the object is determined based at least in part on the projected first pattern of light, the captured first image, and the baseline distance. A first six-DOF values of the first six-DOF retroreflector target are determined with the six-DOF laser tracker in a first device frame of reference. A registered 3D coordinates of the first point in the first device frame of reference is determined based at least in part on the first measured 3D coordinates of the first point and the first six-DOF values of the first six-DOF retroreflector target. The registered 3D coordinates of the first point are stored.

In accordance with another embodiment, the method further comprises activating the first motorized stand to move the mobile 3D measuring system to a second position. A second pattern of light is projected with a projector onto the object. A second image of the second pattern of light on the object is captured with a camera. A second measured 3D coordinates of a second point on the object is determined based at least in part on the projected second pattern of light, the captured second image, and the baseline distance. A second six-DOF values of the first six-DOF retroreflector target are determined with the six-DOF laser tracker in the first device frame of reference. A registered 3D coordinates of the second point in the first device frame of reference is determined based at least in part on the second measured 3D coordinates of the second point and the second six-DOF values of the first six-DOF retroreflector target.

In accordance with an embodiment, the method further comprises moving the six-DOF laser tracker to a second device frame of reference. A third six-DOF values of the first six-DOF retroreflector target are determined with the six-DOF laser tracker in the second device frame of reference. A third pattern of light is projected with the projector onto the object. A third image of the third pattern of light on the object is captured with a camera. A third measured 3D coordinates of a third point on the object are determined based at least in part on the third pattern of light, the captured third image, and the baseline distance. A third six-DOF values of the first six-DOF retroreflector target are determined with the six-DOF laser tracker, determining in the second device frame of reference. A registered 3D coordinates of the third point in the first device frame of reference are determined based at least in part on the third measured 3D coordinates of the third point, the second six-DOF values of the first six-DOF retroreflector target, and the third six-DOF values of the first six-DOF retroreflector target.

In accordance with still another embodiment, a method is provided that includes providing a mobile three-dimensional (3D) measuring system including a 3D scanner coupled to a first motorized stand and to a plurality of targets, the first motorized stand including a plurality of motorized wheels configured to propel and turn the first motorized stand under computer control, the 3D scanner including a projector and a camera, the projector configured to project a pattern of light, the camera separated from the projector by a scanner baseline distance. A computer system is provided in communication with the mobile 3D measuring system. A first image sensor is provided in an environment frame of reference. A first image of the plurality of targets is obtained with the first image sensor. A first position of the mobile 3D measuring system is determined by the computer system within the environment frame of reference based at least in part on the first image. The first position is provided to the mobile 3D measuring system. A position of the 3D measuring system within the environment frame of reference is determined by the mobile 3D measuring system based at least in part on the first position. The determined position of the 3D measuring system within the environment frame of reference is stored.

In accordance with another embodiment, the first image sensor is a first two-dimensional (2D) camera. In accordance with another embodiment, the first image sensor is a depth camera that measures 3D coordinates. In accordance with another embodiment, in determining by the mobile 3D measuring system the position within the environment frame of reference, the determining is further based on a map of surroundings through which the mobile 3D measuring system moves. In accordance with another embodiment, the method further comprises providing a second image sensor, the second image sensor being a second 2D camera, there being an image-sensor baseline distance between the first 2D camera and the second 2D camera.

In accordance with another embodiment, the method further comprises obtaining with a second image sensor a second image of the plurality of targets. In accordance with an embodiment, the determining by the computer system the first position of the mobile 3D measuring system within the environment frame of reference further based on the second image and an image-sensor baseline distance. In accordance with an embodiment, the at least one of the plurality of targets is selected from the group consisting of: a light-emitting diode (LED), a reflective spot, and a retroreflector. In accordance with an embodiment, at least one of the plurality of targets is a light-emitting diode (LED) that is modulated in time.

In accordance with still another embodiment, a method is provided that includes providing a mobile three-dimensional (3D) measuring system that includes a 3D measuring device and a motorized stand. The mobile 3D measuring system is moved, with the motorized stand, to a first position, measuring with the 3D measuring device 3D coordinates of a first point on a diffusely scattering surface, and measuring with the 3D measuring device first 3D coordinates of at least three cooperative targets. The mobile 3D measuring system is moved, with the motorized stand, to a second position, measuring with the 3D measuring device 3D coordinates of a second point on the diffusely scattering surface, and measuring with the 3D measuring device second 3D coordinates of the at least three cooperative targets. A 3D coordinates of the first point and the second point in a common frame of reference are determined based at least in part on the measured 3D coordinates of the first point, the measured 3D coordinates of the second point, the measured first 3D coordinates of the at least three cooperative targets at the first position, and the measured second 3D coordinates of the at least three cooperative targets measured at the second position. The determined 3D coordinates of the first point and the second point in the common frame of reference are stored.

In accordance with an embodiment, the 3D measuring device is configured to measure at least one cooperative target selected from the group consisting of: a cube-corner retroreflector, a cateye retroreflector, and a tooling ball. In accordance with an embodiment, the 3D measuring device is further configured in a mode of operation to focus light from the 3D measuring device onto the diffusely scattering surface.

In accordance with still another embodiment, a method is provided that includes providing a plurality of mobile three-dimensional (3D) measuring systems, each system including a 3D measuring device and a motorized stand, each 3D measuring device configured to project light onto a point and to determine 3D coordinates of the point by measuring a distance, a first angle, and a second angle to the point. A user interface is provided that is configured to enable user control of the plurality of mobile 3D measuring systems. Actions of the plurality of mobile 3D measuring systems are directed concurrently through the user interface by an operator.

In accordance with an embodiment, the at least one 3D measuring system includes a 3D measuring device having a 3D time-of-flight scanner. In accordance with an embodiment, the at least one 3D measuring system includes a 3D measuring device having a triangulation scanner. In accordance with an embodiment, the at least one 3D measuring system includes a laser tracker. In accordance with an embodiment, the at least one 3D measuring system includes a 3D measuring device that is configured to measure 3D coordinates of a retroreflector and in addition is configured to measure 3D coordinates of a diffusely reflecting surface. In accordance with an embodiment, wherein the method further comprises sending instructions to the plurality of mobile 3D measuring systems through a network computer.

In accordance with an embodiment, in the step of concurrently directing actions, each of the plurality of mobile 3D measuring systems disregards any direction that would result in a collision with a person or an object. In accordance with an embodiment, the user interface includes a virtual reality wearable device. In accordance with an embodiment, the user interface includes an immersive headset. In accordance with an embodiment, the user interface includes augmented reality eyeglasses. In accordance with an embodiment, the user interface includes a touchscreen display. In accordance with an embodiment, the user interface includes a plurality of display monitors. In accordance with an embodiment, the method further comprises providing to the user interface 3D information collected by one or more of the plurality of mobile 3D measuring systems as selected by the operator through the user interface.

In accordance with an embodiment, the method comprises directing, by the operator, the mobile 3D measuring system to obtain 3D measurements of an object and to compare the obtained 3D measurements to characteristics of the object, the characteristics of the object being stored in memory, the characteristics of the object being accessible to the operator through the user interface. In accordance with an embodiment, the method further comprises updating the characteristics of the object as stored in memory, the updating based at least in part a difference in the obtained 3D measurements of the object and the characteristics of the object as stored in memory.

In accordance with an embodiment, the method further comprises identifying an object based as least in part on a comparison of a 3D measurement of the object by the mobile 3D measuring system and a representation of the object as stored in memory. In accordance with an embodiment, the user interface is configured to enable the operator to extract performance information associated with the identified object, the performance information being selected from the group consisting of: number of items, size of items, items in inventory, defect rate, and production rate. In accordance with an embodiment, the method further comprises a step of reading a tag associated with the identified object, the tag being one of a bar-code tag, a QR-code tag, or a radio-frequency identification (RFID) tag.

In accordance with an embodiment, the method further comprises obtaining from memory a collection of paths within an environment. A first mobile 3D measuring system selected by the operator from the plurality of mobile 3D measuring systems is sent along a path within the environment. A width of an unobstructed passage of the path is determined with the 3D measuring system. In accordance with an embodiment, the method further comprises providing an alarm indication if the width of the unobstructed passage of the path is less than a predetermined minimum passage width.

In accordance with still another embodiment, a method is provided that includes providing a mobile 3D measuring system including a 3D measuring device and a motorized stand, the 3D measuring device configured to project light onto a point and to determine 3D coordinates of the point by measuring a distance, a first angle, and a second angle to the point. The motorized stand is activated to locate building elements in need of trim. A size and shape of each required trim element is measured with the mobile 3D measuring system. A link is provided between a building location and a trim dimensions.

In accordance with another embodiment, in activating the motorized stand to locate the building elements in need of trim, the mobile 3D measuring system inspects a room to identify elements in need of trim. In accordance with another embodiment, the trim is measured for the elements selected from the group consisting of doors, windows, floors, and ceilings. In accordance with another embodiment, the method further comprises cutting the trim according to the measured sizes and shapes. In accordance with another embodiment, the method further comprises a step of attaching an identifier label on each trim element, the identifier label reflecting the link between building location and a trim element dimensions.

In accordance with still another embodiment, a method is provided that includes providing a mobile 3D measuring system including a 3D measuring device and a motorized stand, the 3D measuring device configured to project light onto a point and to determine 3D coordinates of the point by measuring a distance, a first angle, and a second angle to the point. A size and shape of a floor region is measured with the mobile 3D measuring system. A floor covering is cut to the measured sizes and shape of the floor region.

In accordance with still another embodiment, a method is provided that includes providing a mobile 3D measuring system including a 3D measuring device and a motorized stand, the 3D measuring device configured to project light onto a point and to determine 3D coordinates of the point by measuring a distance, a first angle, and a second angle to the point. An electronics design plan is obtained. Obtaining measured 3D information by scanning a room with the mobile 3D measuring system. An electronic information giving detailed shape and size of at least one countertop is generated based at least in part on the electronics design plan and the measured 3D information.

In accordance with still another embodiment, a method is provided that includes providing a mobile 3D measuring system including a 3D measuring device and a motorized stand, the motorized stand configured to move the 3D measuring device under computer control, the 3D measuring device configured to project light onto a point and to determine 3D coordinates of the point by measuring a distance, a first angle, and a second angle to the point, the 3D measuring device further configured to emit a visible beam of light as a pointer beam. A 3D coordinates of objects in an environment is measured with the 3D measuring device. Electronic plans are provided indicating a desired location of a construction installation line within the environment. The visible beam of light is emitted with the 3D measuring device to illuminate the construction installation line in the environment, the illuminated construction installation line positioned within the environment based at least in part on measured 3D coordinates of objects in the environment and on the electronic plans.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A mobile three-dimensional (3D) measuring system, comprising:
   a 3D measuring device;
   a stand having a plurality of legs coupled to the 3D measuring device;
   a motorized dolly detachably coupled to the stand;
   a sensor configured for obstacle avoidance, wherein the sensor is coupled to the 3D measuring system;
   a controller that is configured to upon completion of a first scan, by the 3D measuring device, at a first position using a first scanning mode, switch to a second scanning mode and perform a second scan in the second scanning mode when the 3D measuring system begins to move to a second position responsive to a signal from a position sensor; and
   wherein the motorized dolly is activated to move the 3D measuring system to the second position, based at least in part on data from the sensor.

2. The system of claim 1, wherein the motorized dolly is configured to move forward or backward and to rotate.

3. The system of claim 1, wherein the motorized dolly is configured to fold into a compact shape.

4. The system of claim 1, wherein the 3D measuring device is a time-of-flight scanner.

5. The system of claim 4, wherein the 3D measuring device emits a collimated beam of light.

6. The system of claim 4, wherein the 3D measuring device emits a focused beam of light.

7. The system of claim 6, wherein the 3D measuring device is configured to measure 3D coordinates of a tooling ball.

8. The system of claim 1, wherein the sensor is selected from the group consisting of a two-dimensional (2D) scanner, a 3D scanner that directs light in a horizontal plane, a 2D camera, a 3D depth camera, and an ultrasound sensor.

9. The system of claim 1, wherein the 3D measuring device is a laser tracker or a total station.

10. The system of claim 9, wherein the 3D measuring device is configured to measure 3D coordinates of a retroreflector.

11. The system of claim 10, wherein the 3D measuring device is further configured to measure 3D coordinates of a diffuse surface.

12. The system of claim 1, wherein the 3D measuring device is further configured for wireless communication.

13. The system of claim 12, wherein the wireless communication is based, at least in part, on an IEEE 802.11 standard.

14. The system of claim 12, wherein the wireless communication includes cellular communication.

15. The system of claim 14, wherein the cellular communication includes one of 3G and long-term-evolution (LTE) protocols.

16. The system of claim 1, wherein the stand is a tripod.

17. The system of claim 1, wherein the motorized dolly includes two wheels that turn, each wheel connected to an axle driven by a motor.

18. The system of claim 17, wherein a rotation of each motor is measured by an angular encoder.

19. The system of claim 1, wherein the motorized dolly further includes one or more extensions to which a sensor may be attached.

20. The system of claim 1, wherein the motorized dolly is configured to operate without user intervention between the first position and the second position.

* * * * *